Feb. 5, 1929. 1,700,970
W. C. BAXTER
MACHINE FOR USE IN THE MANUFACTURE OF SHOES
Original Filed Nov. 10, 1921  17 Sheets-Sheet 7

INVENTOR
William C Baxter
By his Attorney,

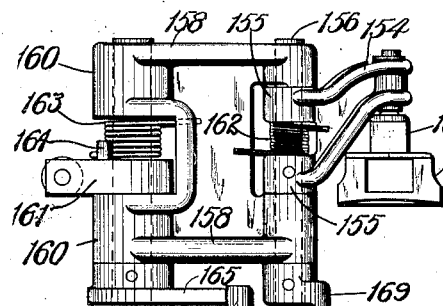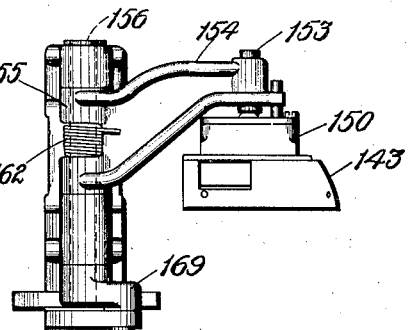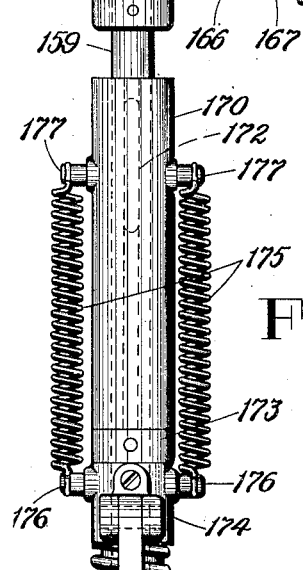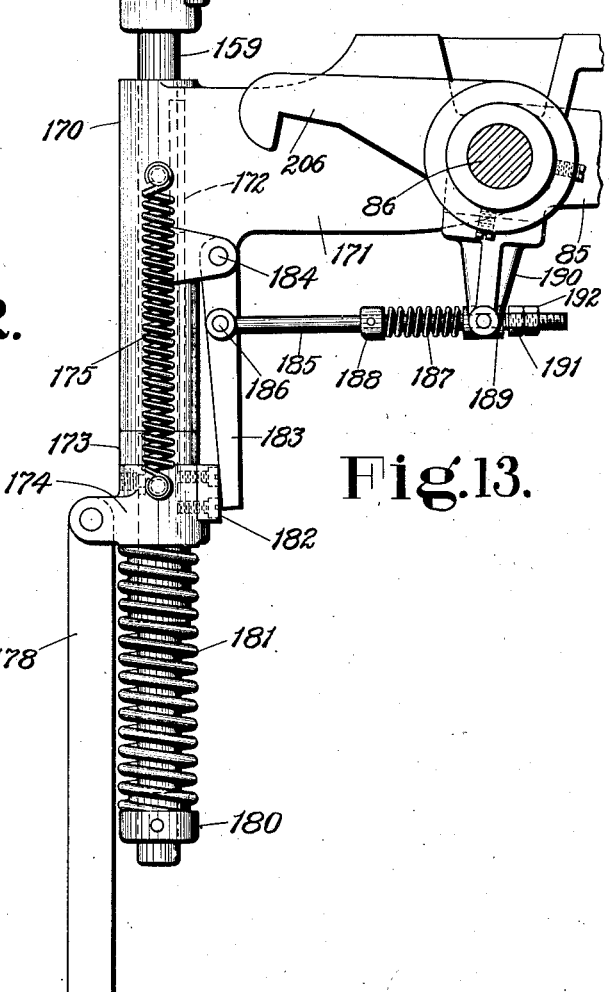
Fig. 12.
Fig. 13.

Feb. 5, 1929. 1,700,970
W. C. BAXTER
MACHINE FOR USE IN THE MANUFACTURE OF SHOES
Original Filed Nov. 10, 1921 17 Sheets-Sheet 9

INVENTOR
William C. Baxter
By his Attorney,
Nelson Howard

Feb. 5, 1929.
W. C. BAXTER
1,700,970
MACHINE FOR USE IN THE MANUFACTURE OF SHOES
Original Filed Nov. 10, 1921
17 Sheets-Sheet 12

Feb. 5, 1929.　　　　　　　　　　　　　　　　1,700,970
W. C. BAXTER
MACHINE FOR USE IN THE MANUFACTURE OF SHOES
Original Filed Nov. 10, 1921　　17 Sheets-Sheet 13

INVENTOR
William C. Baxter
By his Attorney
Nelson M_____

Feb. 5, 1929. 1,700,970
W. C. BAXTER
MACHINE FOR USE IN THE MANUFACTURE OF SHOES
Original Filed Nov. 10, 1921 17 Sheets-Sheet 16

INVENTOR
William C. Baxter
By his Attorney,
Wilson W. Howard

Feb. 5, 1929.

W. C. BAXTER

MACHINE FOR USE IN THE MANUFACTURE OF SHOES

Original Filed Nov. 10, 1921    17 Sheets-Sheet 17

INVENTOR.
William C. Baxter

Patented Feb. 5, 1929.

1,700,970

UNITED STATES PATENT OFFICE.

WILLIAM C. BAXTER, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR USE IN THE MANUFACTURE OF SHOES.

Application filed November 10, 1921, Serial No. 514,247. Renewed May 5, 1928.

This invention relates to machines for use in the manufacture of shoes, and is herein illustrated in its application to a machine for operating upon the heel end portion of upper materials to shape them over a form and to secure them to an insole. It will be recognized, however, that in many of its novel aspects the invention is not limited to machines which operate upon the heel end portion of shoe materials nor to machines for performing the particular operations performed by the machine herein shown.

Notwithstanding the many important improvements made in recent years in the shoe-making art, including the development of highly efficient machinery for performing operations which were formerly carried out by hand labor, it is nevertheless true that many of the important operations in shoe manufacture still depend for success upon the skill and judgment of the workman, particularly in positioning the shoe materials in relation to the instrumentalities which operate upon them. For example, in the shaping of the heel end portion of upper materials, successful results in respect to the final shape of the shoe and the relation of the lines of the upper to other shoe parts depend upon the accuracy with which the upper is positioned both heightwise and peripherally in relation to the upper shaping means. Such positioning of the upper has heretofore been left very largely to the eyes and fingers of the workman, and even with the exercise of such great skill and care as are obtainable at a high labor cost, the results have often fallen short of that degree of accuracy and uniformity which is desirable in the best shoe-making. The present invention, in one important aspect, aims to effect an improvement in upper shaping machines with a view to standardization in the shaping of the upper materials independently of any high degree of skill on the part of the workman, thus eliminating the need for such skill and the consequent high labor cost and at the same time insuring uniform excellence in the quality of the work.

To the above and other ends, a feature of the invention consists in a novel organization of upper shaping means and means for jigging the upper to position it in relation to the upper shaping means. That is, as herein exemplified, there is provided means for insuring by engagement with positioning surfaces formed on the upper in predetermined relation to a characteristic thereof the proper position of the upper in relation to the upper shaping means in respect to such movement as might affect the accuracy of the shape imparted to the upper by said means. In its illustrative application to the shaping of the heel end portion of upper materials over a form, the invention provides means for jigging the heel end portion of the upper to determine its position peripherally about the form and the extent of projection of its margin beyond the plane of the bottom face of the form. In the construction shown the jigging of the upper is effected by jigging means comprising a plurality of jig pins arranged to enter jig holes previously formed in the margin of the heel end portion of the upper in predetermined relation to a characteristic of the upper and in different locations lengthwise of the upper, thus fixing in accordance with a predetermined standard the location of the back seam and its angular relation to the form and determining the width of the margin of the upper which is turned inward to form the heel seat flange both at the rear end and along the sides of the heel seat. In addition to features involved in the general organization thus provided, features of the invention are also to be recognized in a novel construction and arrangement affording provision for control of the jigging means to determine its relation to the form and to move it into and out of operative position. In the construction shown the upper jigging means, comprising a jig head upon which the upper engaging jig pins are movably mounted, is positioned in automatically determined relation to the form and maintained in that relation as the form is moved to carry the work to the cooperating upper shaping instrumentalities, and is withdrawn from operative position after the upper has been clamped about the form.

In assembling an upper with an insole in the relation which these parts are to have in the finished shoe, it is important for satisfactory results that the insole be accurately located in relation to the upper. As a further contribution to standardization, the invention provides, as an important feature, means for insuring accuracy in the location of the insole by the utilization of jigging, the construction shown comprising a plurality of jig pins which project from the form over which the upper is shaped and are positioned to enter jig holes previously provided in the heel end portion of the insole to fix the location of the insole both lengthwise and angularly in relation to the form. In still another aspect, a feature of the invention is to be recognized in the provision of novel means for jigging different shoe parts, as herein illustrated an upper and an insole, to determine their relation in the finished shoe. By the use of a machine such as herein shown, wherein both an insole and an upper are positioned by jigging in predetermined relation to a form and to means which shape the upper over the form and the insole and are secured in the relation thus determined, uniform accuracy in the shaping of the uppers and in the assembling of the uppers with their insoles is insured throughout a line of shoes independently of any high degree of skill on the part of the workman.

A further important feature of the invention consists in a novel organization including fastening mechanism mounted for movement into and out of operative relation to the work, the machine herein shown having a gang tacker constructed to drive a plurality of upper fastening tacks round the end and along the sides of the heel seat and movable as a unit into and out of position over the heel seat and also toward and from the plane of the heel seat. In the organization herein illustrated the fastening means is maintained in an out of the way position during the assembling and jigging of the shoe materials and until the upper shaping operation has been substantially completed, and is then moved into operative relation to the work, such movement of the fastening means and also its subsequent return to inoperative position being effected automatically in time relation to the other operations of the machine. The machine herein shown comprises, moreover, duplicate or twin mechanisms for operating on different shoes in different locations, with a single tacker mounted for movement selectively to the different locations, and a further feature of the invention is to be recognized in an organization comprising fastening means which is movable to different work locations. The invention also provides novel means of control whereby the common fastening means is moved automatically to the location of any one of the different mechanisms which operate upon the different pieces of work as an incident to the operation of that mechanism. In the organization shown the gang tacker is moved automatically from an idle position substantially between the different upper shaping mechanisms into operative relation to either mechanism in time relation to the cycle of operations of that mechanism upon the shoe, and after the driving of the tacks is returned automatically to its idle position.

Another feature of the invention consists in novel means for supporting an insole lip against the inwardly directed pressure applied in shaping the margin of an upper over the insole. In its illustrative application to a machine which wipes the margin of the heel end portion of an upper over the heel seat face of an insole and into the angle between the feather and the rear end portions of the lip in front of the heel seat, the invention provides novel means for supporting the rear end portions of the lip against the pressure of the wipers comprising, in the construction shown, supporting members which are moved automatically into position over the insole at a predetermined time in the cycle of the machine and are forced apart into engagement with the inner face of the lip at the opposite sides of the insole, together with means for withdrawing said members from operative position prior to the operation of the upper fastening means.

The invention also provides, as a further feature, a novel organization of overwiping means and fastening means affording provision for the fastening of the margin of the upper while the wiping means is maintained substantially at the limit of its overwiping movement. In its embodiment of this feature the construction shown comprises heel seat wipers provided with openings through which fastening tacks are driven, and a gang tacker movable independently of the wipers into and out of position for driving the tacks through said openings.

Still another feature of the invention, as applied to an organization comprising a plurality of different mechanisms for operating on work in different locations, consists in novel means of control for the different mechanisms to insure that only one of said mechanisms will be operated at a time. In the construction shown the desired result is effected by the provision of means which is automatically operative upon the starting of either of the upper shaping mechanisms to lock the starting means for the other mechanism against operative movement. In an organization such as shown, for example, wherein a single fastening mechanism is provided for the different upper shaping mechanisms, this insures against such damage to the machine as might be involved if one of the upper shaping mechanisms were to be started before the other had completed its cycle of operations.

The above and other features of the invention, including also novel means for compressing the margin of the upper between the wipers and the form, novel means for closing the heel embracing band about the form, and various details of construction and combinations of parts, will now be more particularly described with reference to the accompanying drawings and pointed out in the claims.

In the drawings:

Fig. 12 is an enlarged front elevation of part of the mechanism for jigging the upper;

Fig. 13 is a view of the jigging mechanism substantially at right angles to Fig. 12, and also showing the locking means;

Figure 1:
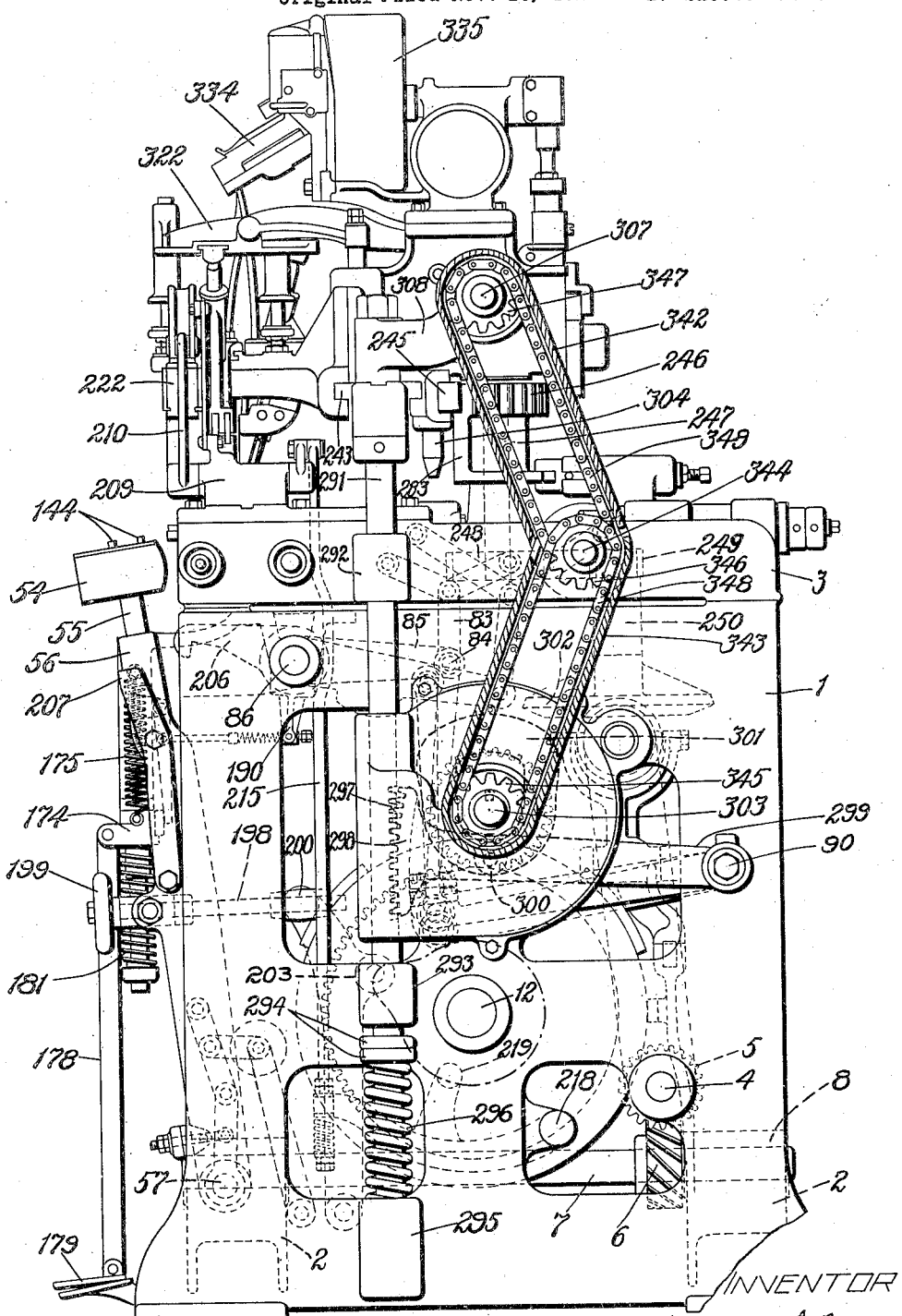
Figure 1 is a side elevation of a machine embodying the invention, some of the parts being broken away for clearness of illustration.

The invention is shown in the accompanying drawings as embodied in a machine for shaping and securing to insoles the heel end portion of shoe uppers of the welt shoe type, wherein the upper is associated with an insole having an upstanding lip. While certain advantages of the invention are more particularly observable in operating on welt shoes, the invention in various aspects is applicable to the manufacture of other types of shoes, and in certain aspects the advantages of the invention may be realized and secured either with or without the association of an insole with the upper.

In the manufacture of shoe uppers to shape an end portion of each upper to the form it is to have in the finished shoe, it is advantageous to employ a plurality of shaping mechanisms, to the end that during the shaping operation of one shaping mechanism another shoe upper may be placed in position for the shaping operation of another shaping mechanism. The machine herein shown is accordingly of the twin type, one of the two mechanisms being adapted for use with right shoes, and the other with left shoes. Except as modified for the treatment of rights and lefts, the two mechanisms are substantially similar in construction and mode of operation, so that a description of one will be sufficient for both.

The machine frame, as shown, comprises side frame members 1, cross ties 2, and a top or table portion 3. Extending between the side frame members is the main driving shaft 4 (Figs. 1, 3 and 5) which may be appropriately driven from any suitable source of power, such, for instance, as an electric motor or a line shaft. It is preferable, though not necessary, that the main driving shaft 4 be continuously driven, and that its operative effect upon the mechanism driven thereby may be controlled by clutch means at the will of the workman. In the present instance, the main driving shaft 4 has secured thereto a gear 5 which is operatively engaged with a gear 6 mounted on the driven shaft 7. The driven shaft 7 is mounted in bearings 8 (Fig. 3) at the front and rear portions of the machine frame, and extends from front to rear substantially midway between the side frames 1.

Figure 3:
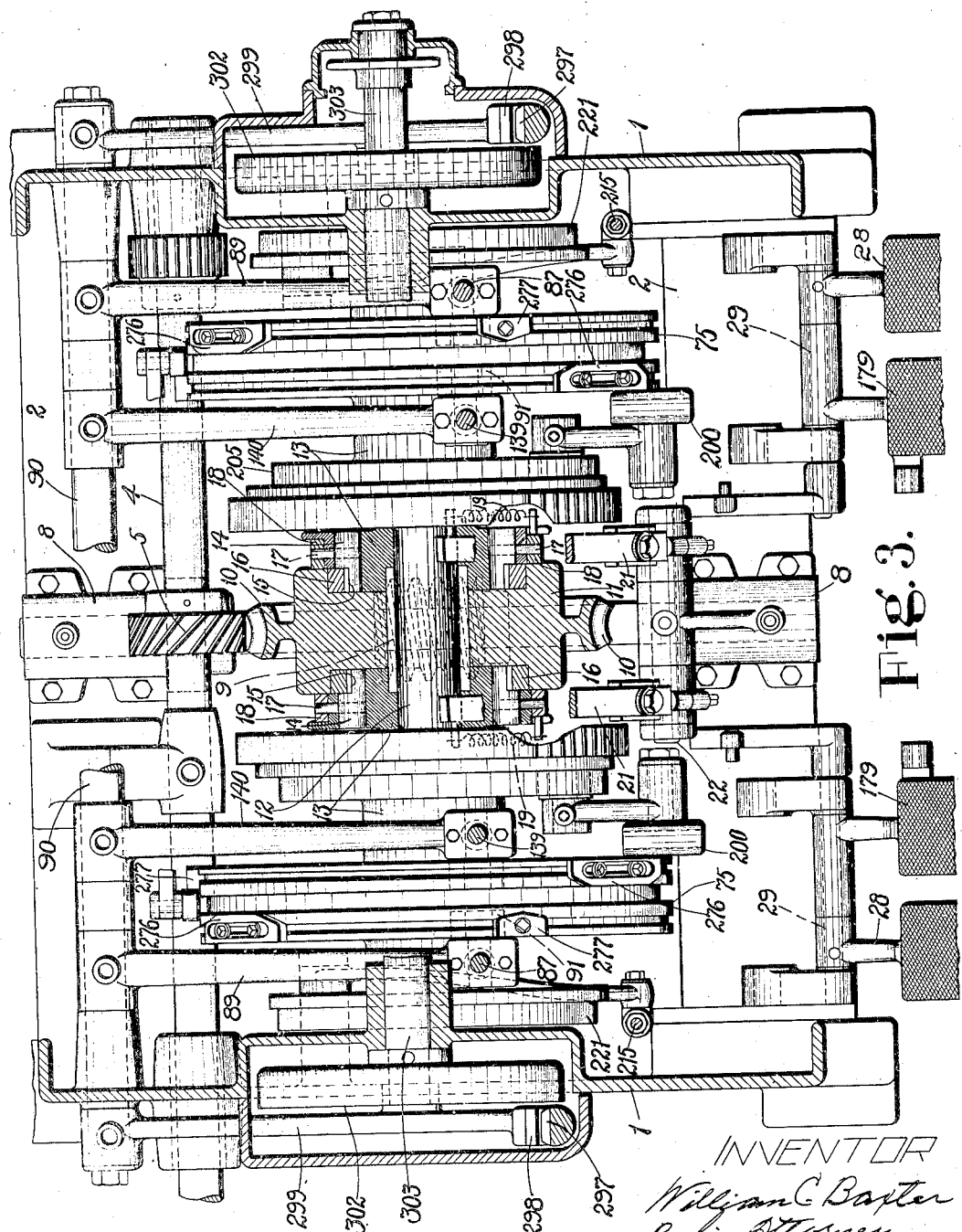
Fig. 3 is a sectional plan view on an enlarged scale substantially on the line 3—3 of Fig. 2.

Secured to the driven shaft 7 is a worm 9 (Figs. 3 and 5) which is engaged with a worm wheel 10 having an enlarged hub portion 11, Fig. 3, loosely mounted upon a dead shaft 12 which extends between the side frames of the machine and on which the worm wheel 10 conveniently may be driven continuously. At each side of the hub portion 11 the dead shaft 12 carries a loose sleeve 13, and on each of the sleeves 13 cams are mounted for effecting movements of the operating parts through trains of mechanism later described.

The sleeves 13 are independent, and either one may be selectively connected to the hub of the worm wheel 10 for rotative movement therewith by clutch mechanism of any preferred type. In the present instance, each of the sleeves 13 is provided with a clutch pin 14, Fig. 3, having a clutch portion 15 adapted to be engaged with and disengaged from a hardened steel ring 16 secured in the side portion of the hub 11. Each of the clutch pins 14 is provided with an outwardly extending portion or pin 17, which engages a ring 18 loosely mounted on the corresponding sleeve 13, and each of the rings 18 is normally under the influence of a spring 19, Fig. 3, tending to rotate the associated clutch pin 14 in a direction to engage the clutch pin with the ring 16 on the worm wheel 10, to cause rotative movement of the associated sleeve. The clutch mechanism for connecting the sleeves 13 selectively with the worm wheel 10 may be of any usual or well known type, that shown in the present instance being such that when one of the sleeves is clutched to the hub of the worm wheel, such sleeve will be rotated, and when it is unclutched from the hub, it will remain idle.

Figure 2:
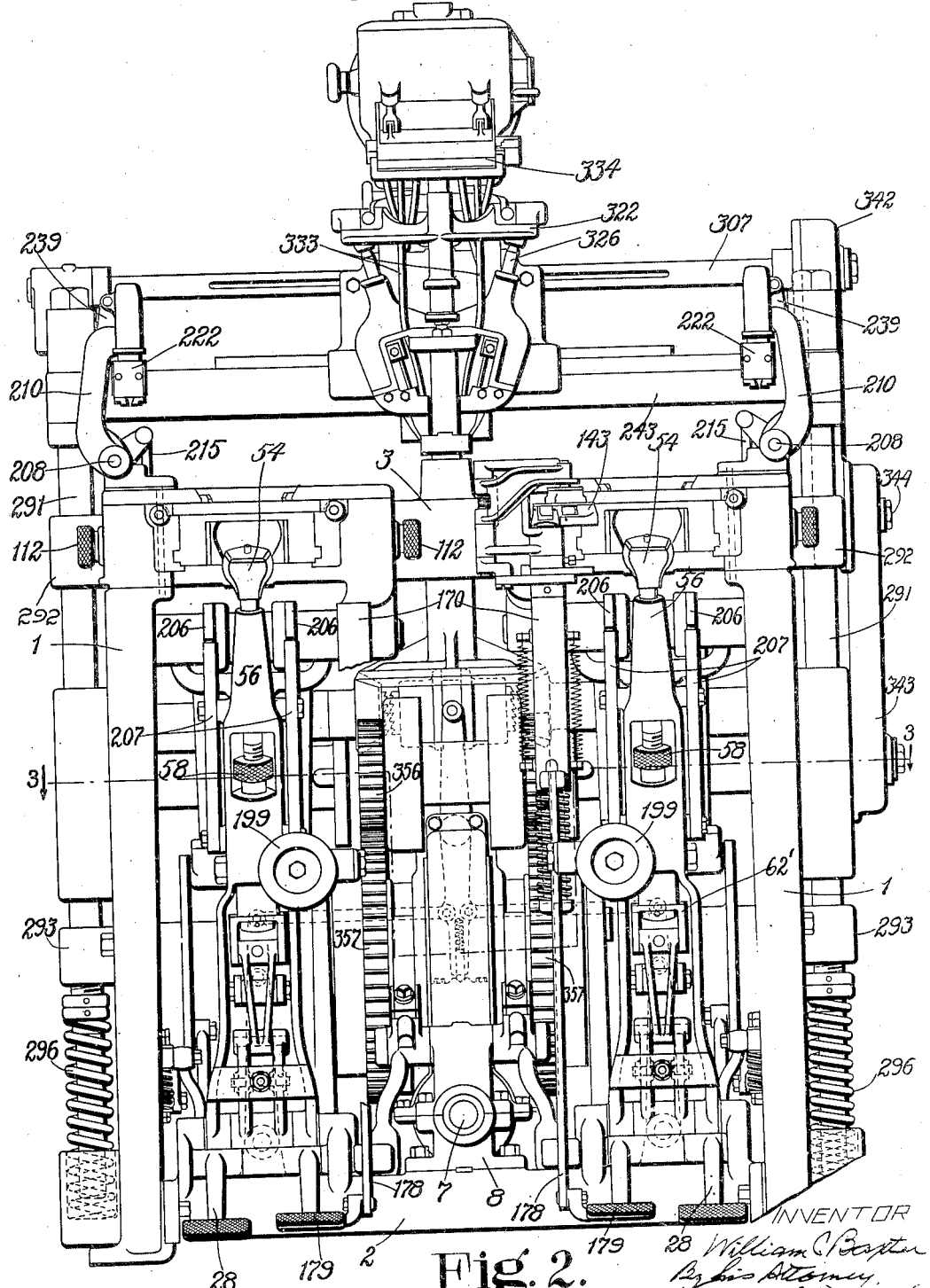
Fig. 2 is a front elevation of the machine with some of the duplicate parts omitted.
Figure 5:
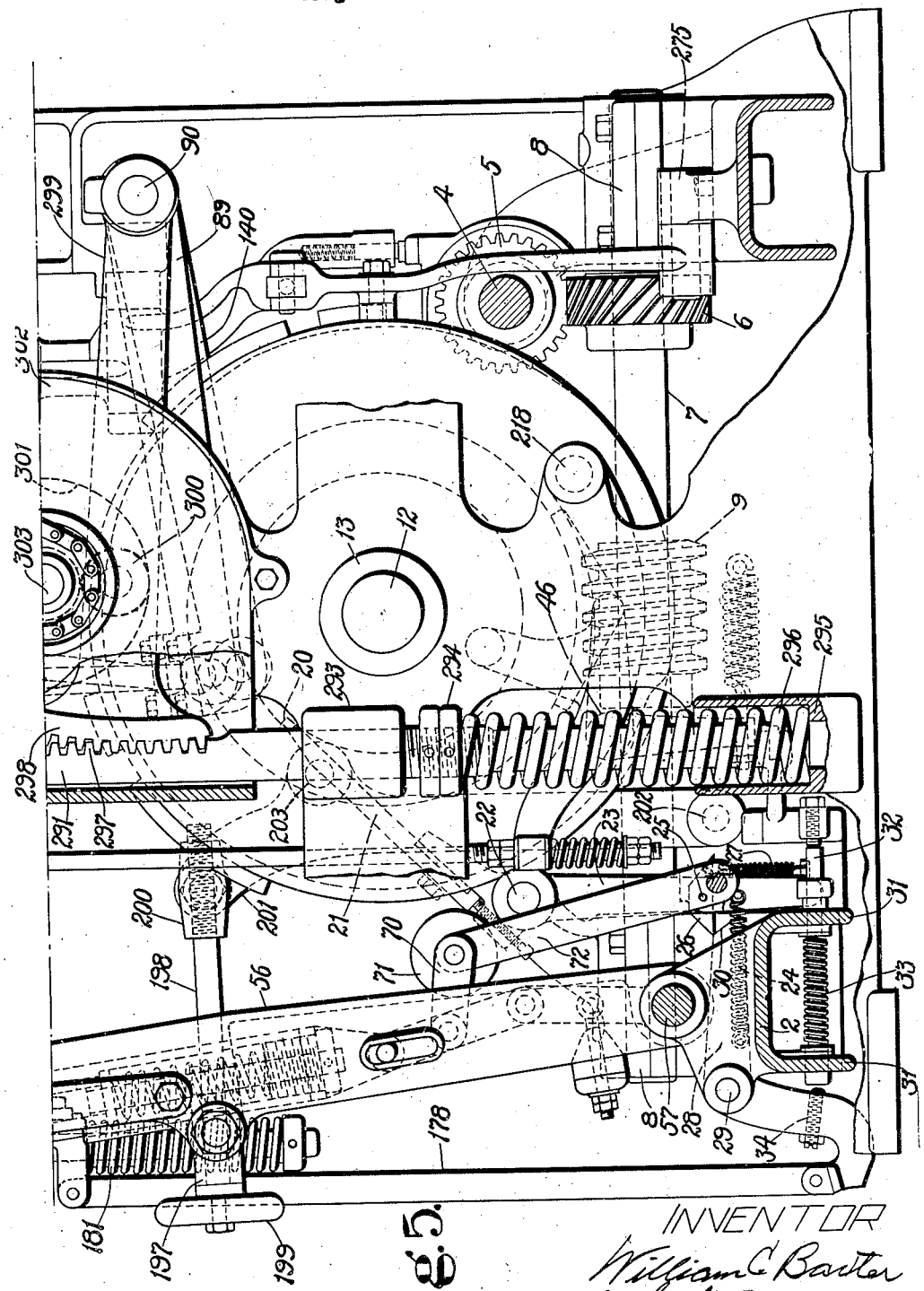
Fig. 5 is an enlarged side elevation of the lower portion of the machine with some of the parts in section and others broken away.
Figure 36:
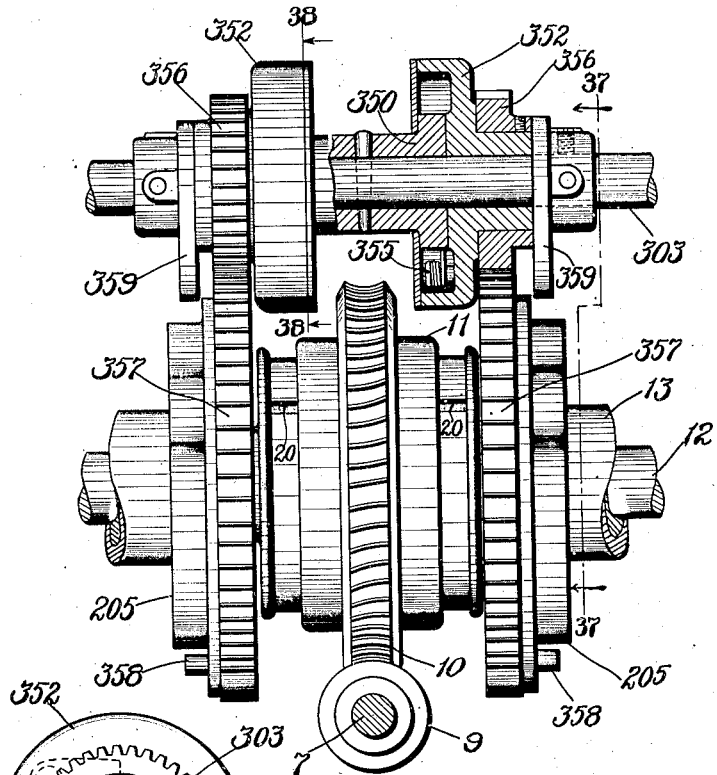
Fig. 36 is an enlarged front view of portions of the means for raising and lowering the fastening mechanism and for operating the tack driving means, certain parts being broken away for clearness of illustration.

Each of the rings 18 is provided with a shoulder 20, Figs. 5 and 36, adapted to engage with a clutch disengaging member 21 the position of which is under control of the workman. The clutch disengaging member 21 is mounted for rocking movement upon a support 22 and has a downwardly extending portion 23 which is normally under the influence of a spring 24 tending to hold the clutch disengaging member in position for engagement with the shoulder 20 and to maintain the associated cam carrying sleeve 13 at rest. It is desirable that after the workman has tripped the clutch disengaging member 21 such member shall move back into position for engagement with the shoulder 20 without further attention on the part of the workman, so that the machine may come to rest after making one cycle of its operations. To this end the downwardly extending portion 23 has pivotally mounted thereon at 25 a trip block 26, normally held in the position indicated in Fig. 5 by a spring 27. A treadle 28, Figs. 2 and 5, is pivotally mounted at 29, and has a backwardly extending inclined end portion 30, Fig. 5, to engage and ride over the end of the trip block 26 when the treadle is depressed. Should the workman fail to remove his foot from the treadle after having depressed it, the member 21 will nevertheless return to clutch disengaging position, the block 26 subsequently tilting to permit the return of the treadle. This construction comprises a convenient form of mechanism for control of the clutch disengaging member and its automatic return to clutch disengaging position, but any suitable clutch disengaging means may be employed with the scope of the present invention.

When one of the treadles 28 has been depressed to start one of the twin mechanisms into operation, it is desirable that the starting treadle of the other twin mechanism be locked to prevent either intentional or accidental operation thereof until the first operating mechanism shall have completed its cycle of operations. A novel means for effecting this purpose is best shown by Figs. 5, 7, 8, 9, 10 and 11, wherein the downturned portions 31 of the front cross-tie 2 have mounted for endwise movement therein push rods 32 which are adapted to be pushed inwardly against the normal action of springs 33, Fig. 5, each by an adjustable bunter 34 when the associated treadle 28 is depressed. Pivotally mounted at 35, Fig. 7, on lugs extended from brackets 36 are bell-crank levers 37, the rear end portions of which are connected by the locking rods 38 and 39. The locking rod 38 carries at its end a locking block 40 which is secured to the rod 38 by a bolt 41 passing through an elongated slot 42, Fig. 8, formed in the rod 39. Similarly, the rod 39 carries a locking block 43 which extends through an elongated slot 44 formed in the rod 38, and is secured to the rod 39 by a bolt 41. A spring 45 connects the locking blocks 40 and 43, preferably by engagement at its ends with the bolts 41, the construction being such that when one of the treadles 28 is depressed, it will act through its associated push rod 32 and bell crank lever 37 to move its associated locking rod 38 or 39 endwise and tension the spring 45, thereby causing the other locking rod and block to move under the action of the spring.

Figure 11:
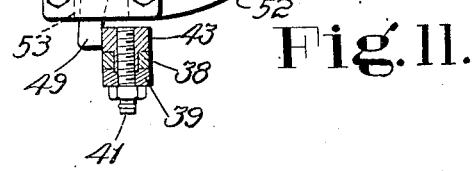
Fig. 11 is an enlarged detail showing a locking member and its tripping cam in side elevation and the locking bars in section.

Pivotally mounted at 46, Figs. 5 and 11, adjacent to each of the locking blocks 40 and 43, is a locking finger preferably formed as a bell-crank lever 47 normally under the influence of a spring 48 tending to move the end 49 of the lever contra-clockwise, viewing Fig. 11. The other end of the bell-crank 47 carries a roll 50 adapted to be depressed by the riser 51 of a cam, one of which is carried by each of the cam carrying sleeves 13. When the twin mechanisms are at rest, the end 49 of each of the bell-cranks 47 rests idly against the face of its associated locking block 40 or 43 under the influence of its spring 48. When, however, one of the treadles 28 is depressed to start one of the twin mechanisms into operation by tripping the clutch controller 21, the locking block associated with the treadle of the other mechanism will be moved, as above described, until the end 49 of the bell-crank snaps in front of the block, Fig. 10, thereby locking the treadle of the idle mechanism until at the end of the cycle of operations of the active mechanism the riser 51 trips the lock, whereupon, both mechanisms being at rest, the parts assume the idle position, Fig. 9. It may be desirable in some cases to guide or steady the locking end of the bell-crank 47, and for this purpose a bracket 52 conveniently is provided with a guideway 53 in which the end of the bell-crank 47 may operate.

Where the heel end portion of a shoe upper is to be shaped, a good form of shaping means comprises inner and outer shaping members, and in case the margin of the upper is to be shaped into an inturned flange, the shaping means may also include means for working the marginal portion of the upper inwardly. For the purposes in view the illustrated machine comprises an inner form between which and an end band and wipers the end of the shoe upper is subjected to the shaping pressure as will be described.

The inner member of the shaping means in the illustrated machine comprises a form 54, the contour portion of which is shaped substantially in accordance with the final shape to be given the end of the upper. The form 54 is carried by a support which permits the form to be moved to and from operative relation to the complemental shaping means. In the present instance the form 54 is supported by a rod 55, Figs. 4 and 24, mounted for lengthwise movement in a carrier 56 pivoted at 57 near the machine base. Mounted on the rod 55 is a collar 58, preferably adjustable by a screw thread connection, as shown, and the reduced lower end of the rod passes loosely through a nut 59 threaded to a sleeve 60 which is supported for sliding movement in the carrier 56. A spring 61 is interposed between the collar 58 and the nut 59, so that upon upward movement of the nut 59 and the sleeve 60 a yielding upward movement will be imparted to the form 54. As shown, the spring 61 is coiled about the lower portion of the rod 55 within the sleeve 60, and its lower end rests upon the nut 59 while its upper end seats upon a washer 62.

Figure 24:
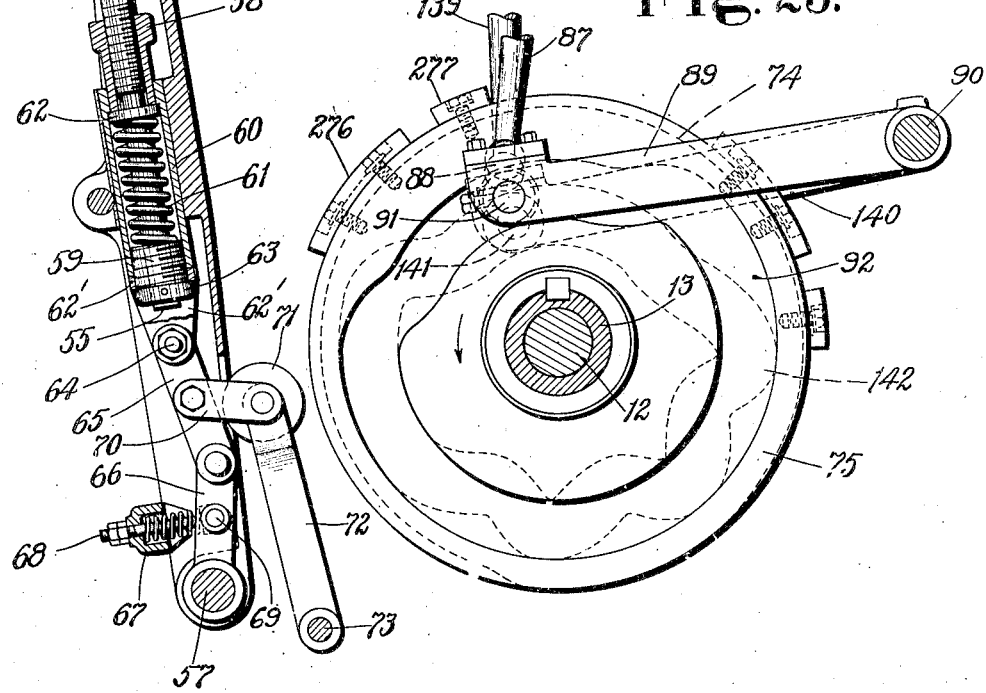
Fig. 24 is an enlarged side elevation showing more particularly the inner form and its supporting and operating means, some of the parts being in section, and also showing by full and dotted lines the cams and arms for operating parts of the outer shaping mechanism.

The sleeve 60 is connected to means for effecting sliding movement thereof in the carrier 56, and as shown best by Figs. 2 and 24, a yoke 62' is engaged between the lower end of the sleeve 60 and a cap 63 secured to the lower end of the rod 55, the construction being such that as the yoke 62' is raised, it will impart upward movement to the sleeve 60. The yoke 62' is connected at 64 to one member 65 of a toggle, the other member 66 of which is pivotally supported at the pivotal axis 57 of the carrier 56. Bridging the lower portion of the carrier 56 is a bearing 67 which supports a spring actuated rod 68. One end of the rod 68 is connected at 69 to the toggle member 66, and normally acts in response to the spring to break the toggle, as indicated in Fig. 24. The toggle is constructed and arranged to be straightened at times automatically, and for this purpose it is connected by a link 70 to a roll 71 carried by a supporting arm 72 pivotally mounted at 73 to the lower portion of the machine frame. A cam 74 on a cam carrier 75 which is mounted on the associated sleeve 13 acts upon the roll 71 in the shoe upper shaping operation to effect an upward movement of the form 54 of sufficient amount to compress the overwiped margin of the upper against the lower face of the wipers, as will more fully appear.

The outer shaping means, as shown, comprises an end band which is caused to embrace the upper to be shaped about the inner member or form and subject it to a shaping pressure; and, when the marginal portion of the upper is to be laid over an insole, the outer shaping means also includes end wipers.

Figure 4:
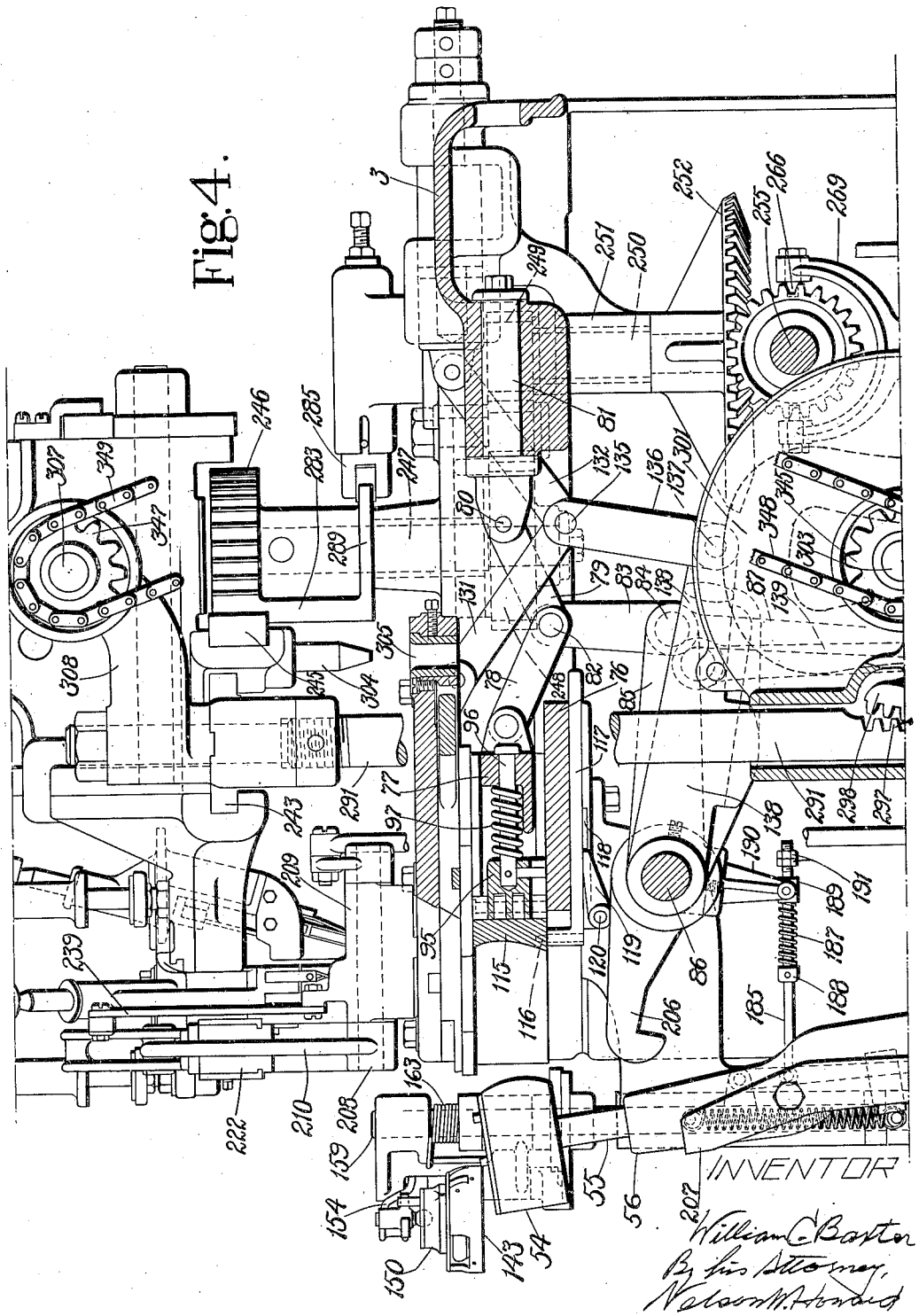
Fig. 4 is an enlarged side elevation of the top portion of the machine, some of the parts being shown in section and others broken away for clearness of illustration.

Mounted for reciprocating movement on ways 76 formed in the frame or table 3, Fig. 4, is a slide or end band operating head 77 having connected therewith one member 78 of a toggle (Figs. 4 and 6), the other member 79 of the toggle being pivotally connected at 80 to a stud 81 appropriately secured to the machine frame or table 3. The toggle members 78 and 79 are connected to an actuator for reciprocating the head 77 by straightening or breaking the toggle. In the present instance the toggle members are connected at 82 to a link 83 pivoted at 84 to an arm 85 mounted for rocking movement on a cross or dead shaft 86. Extending from the arm 85 is an operating rod 87, Fig. 4, the lower end of which is pivotally jointed at 88 to an arm 89, Figs. 3 and 24, mounted for rocking movement on a supporting rod 90 which may conveniently extend between the sides of the machine. The arm 89 carries a pin or roll 91 which rides in a cam groove 92 formed in the face of the cam carrier 75 carried by the cam sleeve 13, the construction being such that upon rotation of the sleeve 13 and the associated cam carrier 75, the toggle will be operated to effect reciprocation of the operating head 77.

The end band is connected to the slide or head 77 for movement into and out of shaping relation to the inner form, and while, in the broad aspect of the invention, the end band may vary in construction, it is preferably made to conform yieldingly to the contour of the surface embraced by it. To this end the band comprises side members 93 and corner members 94 flexibly joined together and connected to a rear member or block 95, Fig. 6, which is itself connected by a pin 96 to the head 77 through which the pin loosely passes. Interposed between the block 95 and the head 77 is a spring 97 which acts normally to advance the block or rear member yieldingly as the head 77 is moved to close the band about the end of the form 54. The corner members of the end band, as shown, are pivotally connected to the side portions of the block 95 at 98, and the contiguous ends of the corner and side members are pivoted to blocks 99.

To close the side and corner members of the band yieldingly about the end of the upper with a shaping pressure as the head 77 is advanced, trains of mechanism connect the blocks 99 and the leading or outer ends of the side members 93 to the head 77, this mechanism in the construction shown comprising toggles operated through connections with the head, and since the toggle mechanism for closing the side and corner members is the same at each side of the end band, a description of one will suffice for both.

Pivotally connected to the block 99 is one member 100 of a toggle, the other member 101 of which is connected at 102 to a yielding abutment 103. A link 104, Fig. 6, connects the joint of the toggle with the head 77, the construction being such that as the head 77 is moved to the left, Fig. 6, the toggle will be straightened more or less and the adjacent side and corner members will be moved inwardly. The abutment 103 preferably is made yielding, and to this end the outer portion of the abutment bears against a spring 105 contained within a socket or recess 106 on the top frame or table 3. Adjustably threaded into the socket 106 is a cap 107 having an inner socketed portion 108 in which is seated one end portion of the spring 105, the construction being such that while the abutment 103 may yield when the toggle is straightened, its yielding capacity may be regulated or adjusted by means of the cap 107.

Figure 6:
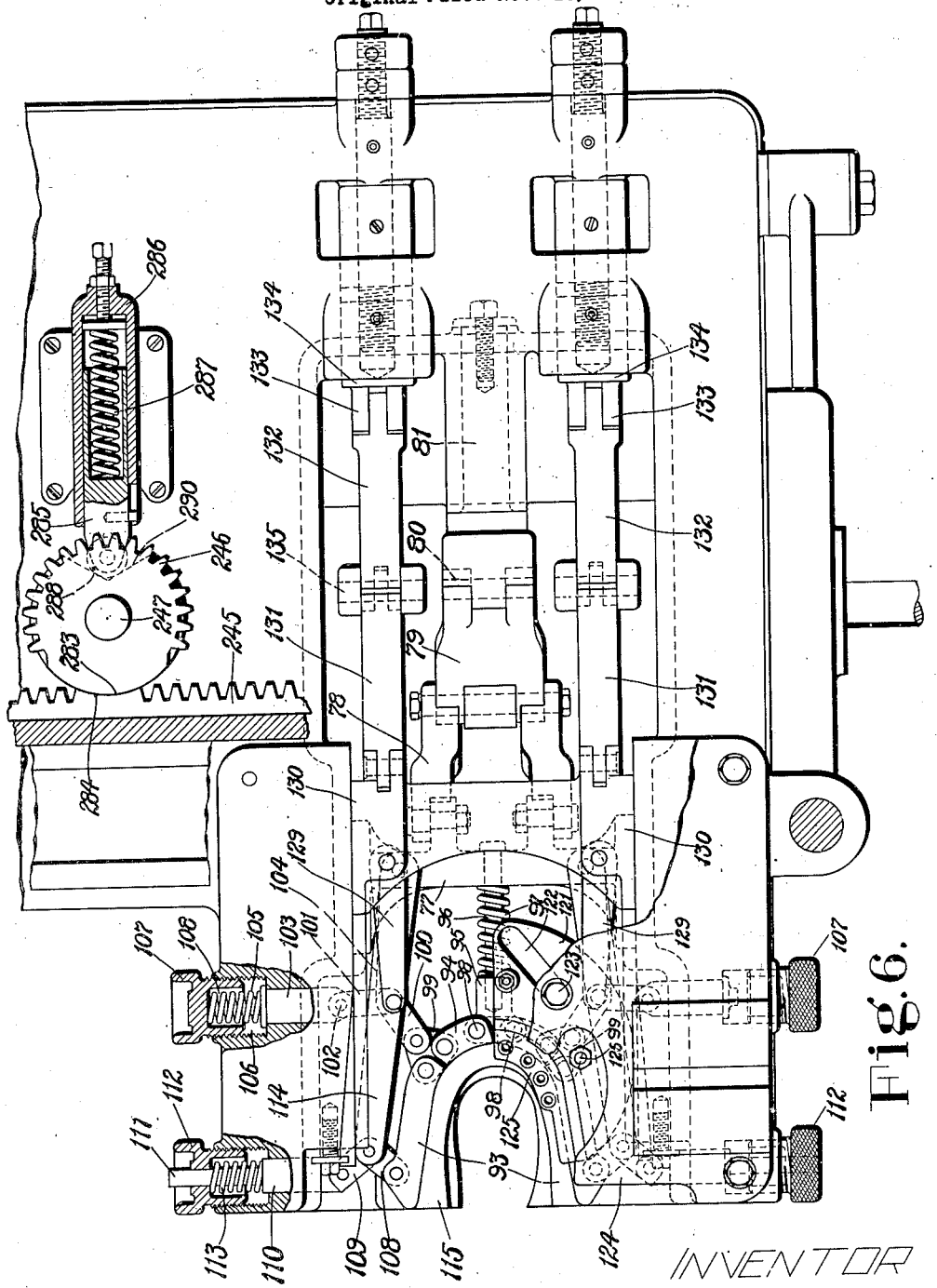
Fig. 6 is a plan view showing one end band and wiper mechanism for shaping the shoe upper, some of the parts being broken away to disclose constructions beyond.
Figure 7:
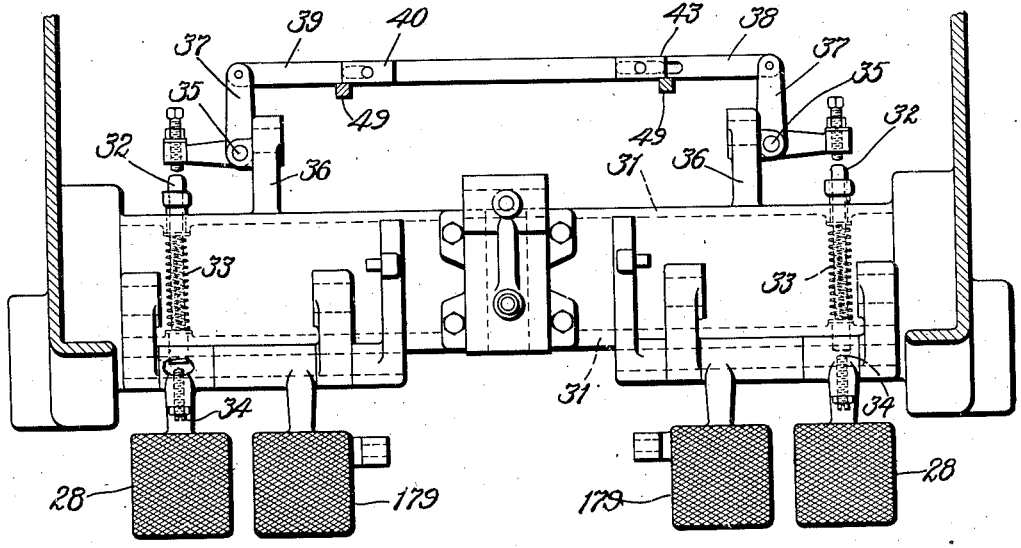
Fig. 7 is an enlarged plan view of the treadle and treadle locking mechanism.
Figure 8:
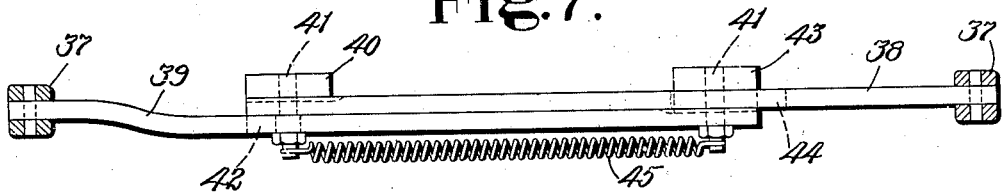
Fig. 8 is an enlarged detail of parts of the locking mechanism.
Figure 9:
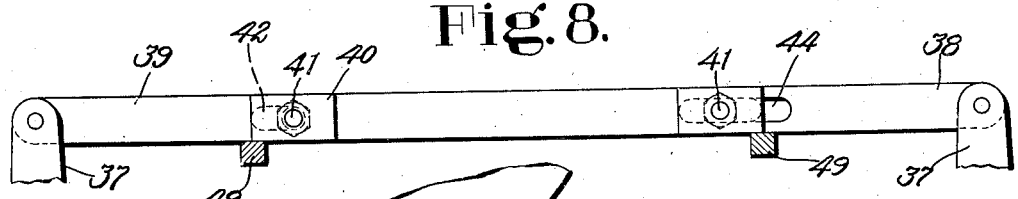
Fig. 9 is a view similar to Fig. 8, substantially at right angles thereto, showing the treadle mechanism unlocked.
Figure 10:
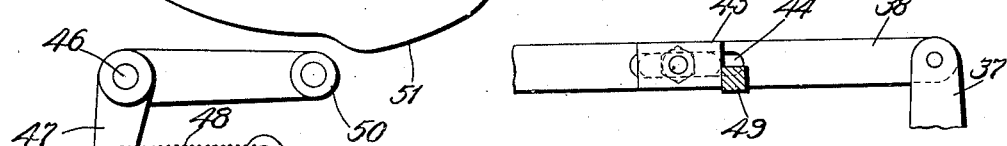
Fig. 10 is a further detail showing a portion of the treadle mechanism locked.

A substantially similar train of toggle mechanism is connected with the end portion of each side member of the end band, as shown in Fig. 6, that is, the end of the side member 93 has connected thereto a toggle member 108, the other toggle member 109 being connected to a yielding abutment 110 mounted for sliding movement in the table or head frame 3. The outer end portion of the abutment is reduced in diameter, as at 111, and passes through an opening in an adjustable cap 112 between which and a shoulder on the abutment is a spring 113 which normally acts to force the abutment inwardly. The toggle members 108 and 109 are connected by a link 114 with the head 77, the construction being such that as the head 77 is moved to the left, Fig. 6, the rear, corner, and side members of the band will be yieldingly closed or pressed about the end of the shoe upper with a shaping pressure dependent upon the tension of the springs 97, 105 and 113.

Figure 30:
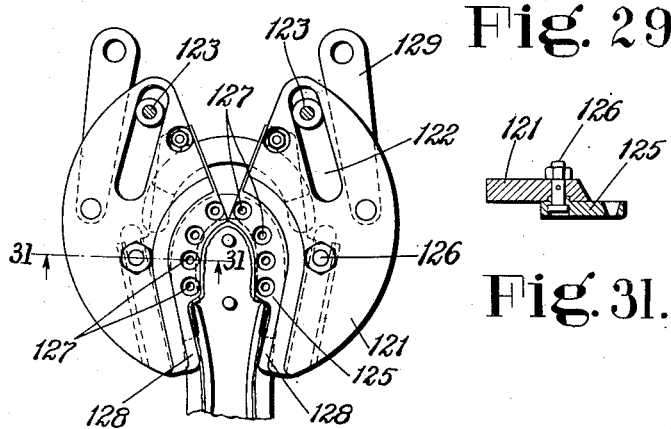
Fig. 30 is a detached plan view showing the wipers in overwiping position, and the upper held ready for the operation of the fastening mechanism.
Figures 31, 32:
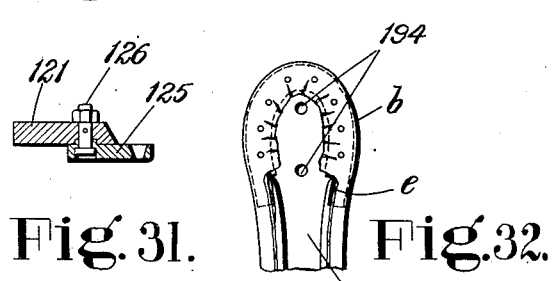
Fig. 31 is a section on the line 31—31 of Fig. 30.
Fig. 32 is a plan view of the heel end of the shaped upper secured to the insole by tacks.

In practice, the outer jointed members of the end band are preferably made of metal, and in order to avoid injury to the shoe upper while the upper is under shaping pressure between the form and the end band, the band is provided with a detachable pad 115, Fig. 4. The pad may be formed of a non-abrasive substance such, for instance, as leather, rubber, composition or the like, and may be conveniently held in operative relation to the outer members of the band by a pin 116, Fig. 4, extending upwardly from a slide 117 mounted for sliding movement with the end band in the head frame of the machine. The slide 117 is provided with a block or shoulder 118 which is engaged by the end of a pawl 119 pivotally mounted at 120 on the frame of the machine. The pawl thus determines the normal idle position of the band while permitting the band to be pressed back against the resistance of the spring 97 by the rearward movement of the form 54.

Where the marginal portions of the shoe upper are to be laid over the bottom of the form or the insole, end wipers are employed for wiping the margin of the upper inwardly after the end portion of the upper has been subjected to the shaping or molding pressure between the form and the band. In the present instance wiper carrier plates 121, Figs. 6 and 30, are each provided with guiding slots 122 in which are pins or rolls 123 extending downwardly from or fixed to a wiper covering plate 124, Fig. 6. Each of the carrier plates has secured thereto a wiper 125, Figs. 30 and 31. In the present instance the wipers are connected to the carrier plates by bolts 126 and are capable of adjustment in guideways in the carrier plates.

The wipers 125 are of novel construction, and in addition to openings 127 adjacent to their edge portions through which fastenings or tacks may be driven to secure the overworked edge portion of the upper to the insole, as will more fully appear, the front end 128 of each wiper 125 is provided with an offset shoulder which, as will later appear, acts in conjunction with an insole lip support to form an upstanding flange on the overwiped edge portion of the upper in front of the heel seat, and lays it against an upstanding edge or wing of the counter stiffener adjacent to the rear end portion of the lip of the insole.

Each of the carrier plates 121 is connected by a link 129 to a slide 130, Fig. 6, mounted for reciprocating movement in the top frame or table 3. The slide 130 is reciprocated by a train of mechanism which preferably includes a toggle at each side of the end band operating toggle. Connected to the slide 130 at each side is a toggle member 131, Figs. 4 and 6, the companion toggle member 132 being pivotally connected at 133 to an adjustable thrust member 134. Pivotally connected to the toggle members 131 and 132 at 135 is an actuator for straightening and breaking the toggle, comprising links 136 connected at 137 to a swining frame 138, Fig. 4, which is fulcrumed upon the dead shaft 86. The frame 138 is connected by a link 139 to an arm 140, Figs. 3 and 24, which is mounted for rocking movement on the support 90. The arm 140 has extending therefrom a pin or roll 141 which rides in the wiper cam path 142, Fig. 24, formed in one face of the cam carrier 75 hereinbefore described, the construction being such that upon rotation of the cam the wipers will be caused to close and open. In working the edge portion of an upper over the bottom of the form or insole, it is desirable in some instances to impart to the wipers successive wiping movements, and to this end the cam path 142 is formed with a number of wiper actuating portions, as indicated by dotted lines in Fig. 24.

Standardized uniformity in the shaped ends of all shoe uppers of the same size and style is dependent upon the attainment of the same invariable relation between the different uppers and the shaping instrumentalities. In shaping the heel ends of uppers, for example, any variation in this relation either heightwise of or peripherally about the shaping means will be reflected in the shaped ends of the uppers with corresponding lack of uniformity. In accordance with the present invention uniformity in the relation between the different uppers and the shaping means is insured by a novel organization whereby the position of the upper is determined by jigging. In the practical accomplishment of this purpose each shoe upper is provided with positioning surfaces formed in the same relation to a selected characteristic of the upper on all uppers of the same size and style, and the upper is positioned relatively to the shaping means by a novel jig which engages the upper at the positioning surfaces, and is itself positioned in predetermined relation to the shaping means. This feature of the invention is very important, because it predetermines and insures substantial identity of the shaped ends of all uppers of the same size and style without dependence upon the skill or care of the workman.

In case the shaped upper is to be secured to an insole while under control of the shaping means, as in the illustrated machine, the invention provides means for jigging the insole as well as the upper, in order that the same invariable relation between the upper and the insole will be insured throughout a series of shoes of the same size and style. In accordance with this feature of the invention, as herein illustrated, the insole, like the upper, is provided with positioning surfaces which bear a predetermined relation to some characteristic of the insole, and the insole is engaged at the positioning surfaces by position controllers arranged in predetermined relation to the upper shaping means. The positioning surfaces on the upper and the insole are preferably formed by jig holes, and such jig holes may be made in their predetermined relation to characteristics of the upper and the insole prior to the assembling of the shoe parts for the shaping operation.

The jig mechanism shown for positioning the upper in relation to the shaping instrumentalities comprises a jig head adapted to be supported above the inner form in predetermined relation thereto and to engage the positioning surfaces provided by the jig holes of the upper and support the upper about the form until the positioned upper is subjected to pressure between the form and the end band, and then to release the upper in order that the marginal portion thereof may be worked inwardly over the form. The jig head in the construction shown determines the extent of projection of the edge of the upper beyond the plane of the bottom face of the form, and also definitely fixes the position of the upper peripherally about the form, with the result that the shaped ends of all shoe uppers of a series will be uniform and standardized.

Each jigging mechanism is mounted conveniently at one side of its associated form for movement to and from operative relation to the form, and in the construction shown comprises a jig head 143, Figs. 12 to 18, the lower face of which is shaped to conform to the surface of the heel seat on which it rests when in operative position. The relation of the jig head and the form, when they are operatively positioned, is determined in the construction herein shown by position controllers comprising pins 144 extending from the form and adapted to enter positioning openings 143', Fig. 17, conveniently formed in the lower face of the jig head, these pins being also utilized to jig the insole in relation to the form. Thus when the jig head is placed in position to engage the upper assembled on the form, it will occupy a determinate position in relation to the form, and by engagement with the upper at the predetermined positioning surfaces will unerringly locate the upper in relation to the form and the insole.

Figure 14:
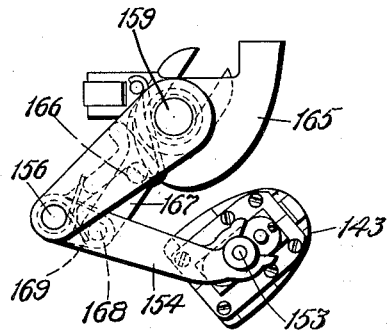
Fig. 14 is a detached view of the jigging mechanism as viewed from above and with the jig head in inoperative position.
Figure 15:
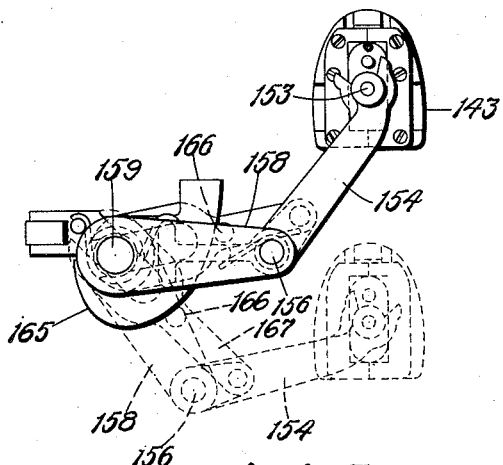
Fig. 15 is a view similar to Fig. 14, showing by dotted and full lines different positions of the jig head.
Figure 17:
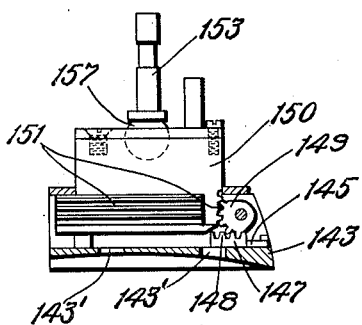
Fig. 17 is a section on the line 17—17 of Fig. 16.
Figure 19:
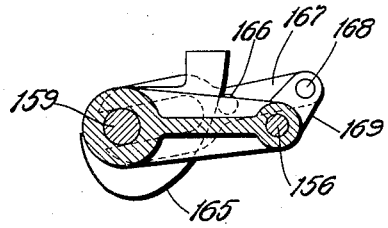
Fig. 19 is a sectional plan view of a portion of the jig mechanism when moved into the position shown by full lines, Fig. 15.
Figure 18:
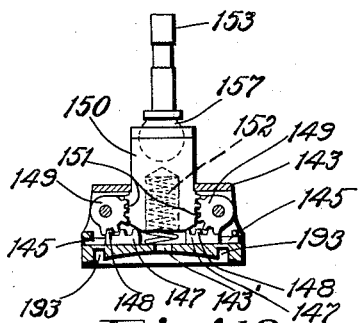
Fig. 18 is a section on the line 18—18 of Fig. 16.
Figure 16:
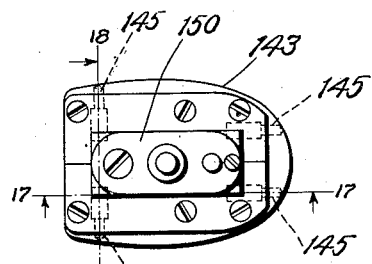
Fig. 16 is a plan view of the jig head detached.
Figure 41:
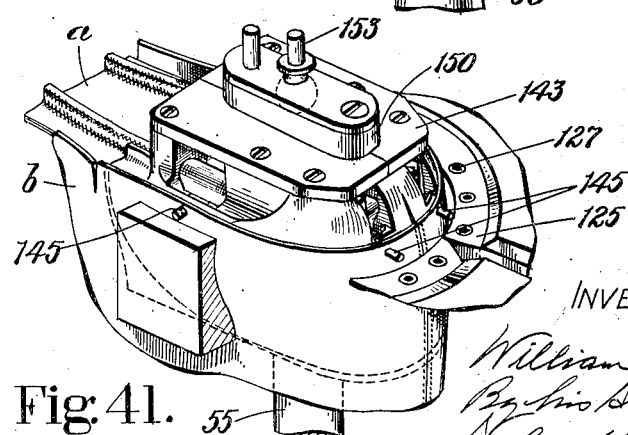
Fig. 41 is a perspective view showing portions of the shaping mechanism and the devices for locating the upper and the insole relatively to each other and to the shaping instrumentalities.

The jig head 143 carries jig pins 145, four being shown in the present instance, two at the rear and one at either side of the head, which are constructed and arranged to enter jig holes 146 formed within the margin of the upper, as indicated in Fig. 41. As shown, the jig holes in the rear of the upper are preferably formed at opposite sides of the back seam and they, as well as the side jig holes, may be formed in the upper at predetermined distances from the back centre of the upper as a datum point, and at predetermined distances from the bottom edge of the upper. The jig pins 145 are carried by their respective slides 147 within the jig head, and each slide is provided with rack teeth 148 which engage the teeth of an adjacent toothed segment 149 pivotally mounted within the jig head, whereby the jig pins may be projected or retracted as will hereinafter appear. Extending into the jig head is a block 150 which is provided with three series of rack teeth 151 engaged with the teeth of the segments 149, the construction being such that upon movement of the block 150 relatively to the head 143, the several jig pins will be simultaneously projected or retracted. The block 150 is normally under the influence of a spring tending to push the block upwardly or outwardly relatively to the jig head. In the present instance a spring 152, Fig. 18, is seated in the block with its lower end resting against the inner surface of the lower portion of the jig head, with the result that the block 150 is normally held in a raised position relatively to the head and through the toothed segments and the rack slides the jig pins are normally retracted or held within the head. A suitable stop which may be conveniently formed by the terminal teeth on the block, serves to prevent disengagement of the block from the head, but with permissive relative movement to project the jig pins when the block is moved in opposition to the spring 152. The jig head is mounted for movements toward and from operative relation to the form on a swinging arm constructed and arranged also to permit the jig head to move with the form to place the jigged upper in position for the operation of the outer shaping means. In the present instance the block 150 is connected by a universal joint to a hanger or stem 153 suspended from an arm 154, Figs. 12 to 15, the hub portion 155 of which is secured to a rock shaft 156. The universal connection between the hanger 153 and the jig head is conveniently formed as a ball and socket joint 157, Figs. 17 and 18, which permits the jig head to adjust itself readily to the shape of the heel seat when placed in operative relation to the form. The rock shaft 156 is mounted in an arm 158 extending from a jigging rod 159, the hub portions 160 of the arm 158 being mounted for rotative movement on the rod and prevented from axial movement thereon by means including a collar 161, the construction being such that while the arm 158 may turn about the jigging rod as an axis, it is confined to axial movement therewith. The arms 154 and 158 are under the influence of springs which normally act to hold the arms and the jig head in inoperative relation to the form 54, as indicated in Figs. 2 and 14. As shown, a spring 162 surrounds the rock shaft 156 and has its end portions bearing upon the web portions of the arms 154 and 158; and similarly a spring 163 surrounds the jigging rod 159 and has one of its ends bearing upon the web portion of the arm 158 and the other end bearing upon a stop or pin 164 on the collar 161, the joint effect of the springs being to hold the jig head normally in its inoperative position with permissive movement to operative position.

To facilitate location of the jig head relatively to the form as the head is moved into operative position by the workman, the present invention includes means for directing the movement of the jig head. This is effected in the present instance by a cam 165 fixed to the jigging rod 159 and a pin or roll 166 carried by a positioning arm 167. The arm 167 has a bifurcated end to embrace the rod 159 and is pivotally connected at 168 to a crank arm 169 secured to the rock shaft 156, Figs. 12, 14 and 15, the effect being that as the jig head is swung toward the form the pin or roll 166 will ride along the cam and cause the arms 154 and 158 to move relatively from the position indicated by full lines, Fig. 14, to that indicated by full lines, Fig. 15, at which time the jig head will be located above the form 54 to receive the position controllers 144 of the form in the positioning holes 143' of the jig head when the latter is depressed.

The jigging rod 159 is mounted in a bearing 170 carried by a bracket 171 projecting from the machine frame at one side of the shaping instrumentalities, and is confined to longitudinal movement therein by a key and keyway 172, Fig. 13. Secured to the jigging rod 159 below the bearing 170 is a collar 173 against which bears a second collar 174 loosely mounted on the rod 159 and normally under the influence of one or more springs 175, two being shown, one end of each of which is secured to a pin 177 projecting from the bearing 170, the other ends of the springs being attached to pins 176 carried by the loose collar 174.

When the jig head has been moved into position over the form, as above described, it is depressed to seat it upon the insole in a position determined by the pins 144 on the form, and as a convenient means to this end the collar 174 has secured thereto a treadle rod 178, the lower end of which is connected to a treadle 179, Figs. 1, 2 and 3, which may be mounted for rocking movement upon the axial support 29 of the starting treadle 28, Fig. 3. Between the loose collar 174 and a collar 180 secured to the lower end of the jigging rod 159 is a spring 181, Figs. 12 and 13, whereby the depression of the head 143 is made yielding to provide for differences in the thickness of stock mounted on the form, as will more fully appear.

A lock is provided to hold the jig head in its operative relation to the form and to relieve the workman of this duty once the jig head has been depressed. As shown, the locking means comprises a locking block 182 carried by the collar 174 and a latch 183 pivotally supported at 184 by the bracket 171, Fig. 13. A spring impelled controller 185 is connected to the latch at 186 and serves to throw the lower end of the latch above the locking block when the latter is depressed. A spring 187 is mounted on the controller 185 and bears at one end on a collar 188 secured to the controller and at the other end against a swiveled abutment 189 carried by a yoke 190. The end portion of the controller is threaded and carries a trip nut 191 which may be locked in adjusted position by a lock nut 192, the construction being such that with the parts in position as indicated in Fig. 13, the latch 183 will move to the left above the locking block 182 when the jigging treadle is depressed and lock the parts in depressed position, and by rocking movement of the yoke 190 contra-clockwise viewing Fig. 13, the controller may be caused to trip the lock as will hereinafter more fully appear, and permit the jig head to return to initial position.

In the present instance, where an upper and an insole of the welt type of shoe are assembled on the form, the jig head is seated upon the heel seat of the insole, and to avoid possibility of injury to the lip of the insole by the jig head, the latter is formed with recesses 193, Fig. 18, into which portion of the insole lip may extend when the jig head and the insole are in their predetermined relative position on the form.

Figure 39:
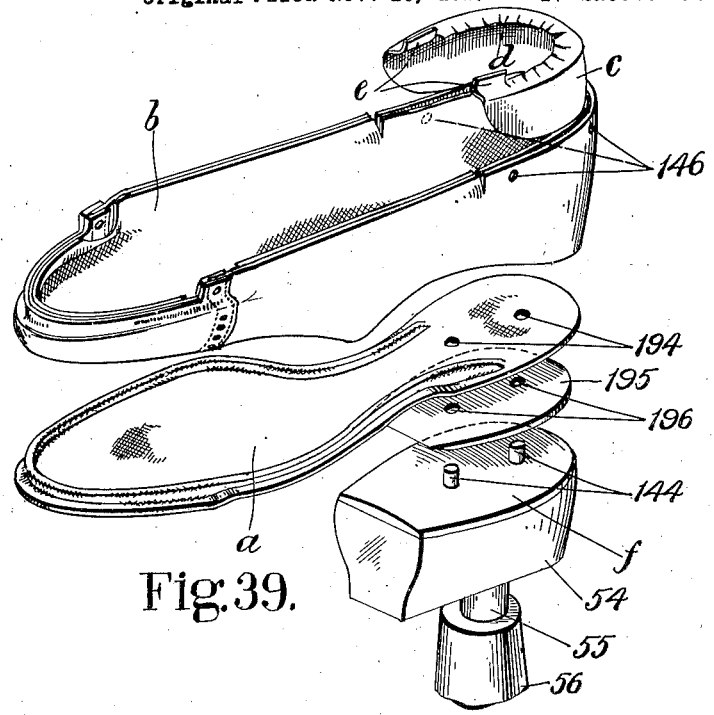
Fig. 39 is a perspective view showing the heel seat reinforcing piece, the insole, the upper, and the counter stiffener in the order in which they are associated on the form, but with the parts in separated relation.
Figure 40:
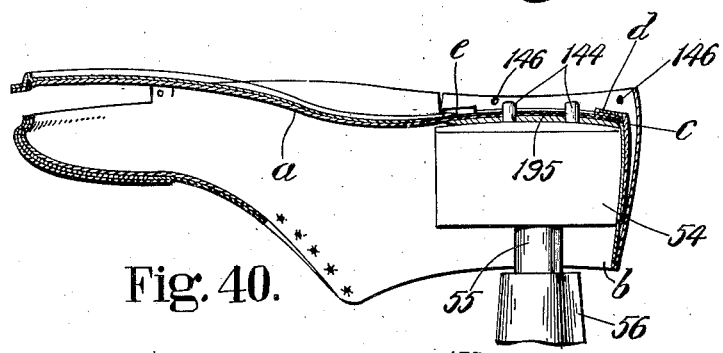
Fig. 40 is a longitudinal section showing the parts illustrated in Fig. 39 in assembled relation prior to the shaping operation.

Mention has been made of jigging the insole to position it in predetermined relation to the form and the upper, and as shown in Fig. 39, the insole $a$ is provided with jig holes 194 which are in predetermined relation to some fixed characteristic of the insole. In assembling the shoe parts on the form, as shown, the jig holes 194 of the insole receive the positioning controllers or pins 144 extending from the form, and in case a heel seat reinforcing piece 195 is to be used, it too is provided with positioning surfaces or jig holes 196 in predetermined relation to a characteristic of the piece, which first receive the pins 144. The upper $b$ is then placed about the form and the counter stiffener $c$, which may have been previously shaped as indicated in Fig. 39, is then inserted between the shoe upper proper and the lining. The assembled shoe parts then appear substantially as indicated in Fig. 40 with the reinforcing piece 195 and the insole in predetermined relation to each other and to the form, and with the upper loosely positioned about the form.

The jig head 143 is now moved into position above the form and the treadle 179 is depressed to seat the jig head on the flange of the counter and the heel seat of the insole with the pins 144 projecting into the recesses or openings 143' of the jig head. Thus the jig head assumes a predetermined position relatively to the form and to the insole previously jigged on the form, and upon further depression of the treadle 179 the block 150 is moved relatively to the jig head and the jig pins 145 are projected into position to receive the upper. The further depression of the treadle 179 lowers the rocking block 182 sufficiently to permit the lock member 183 to move into position above the block and lock the jig head in its seated position. The workman now manipulates the upper to position it in the relation to the form determined by the jig pins which enter the jig holes 146 in the upper materials and suspend the upper about the form.

Figure 25:
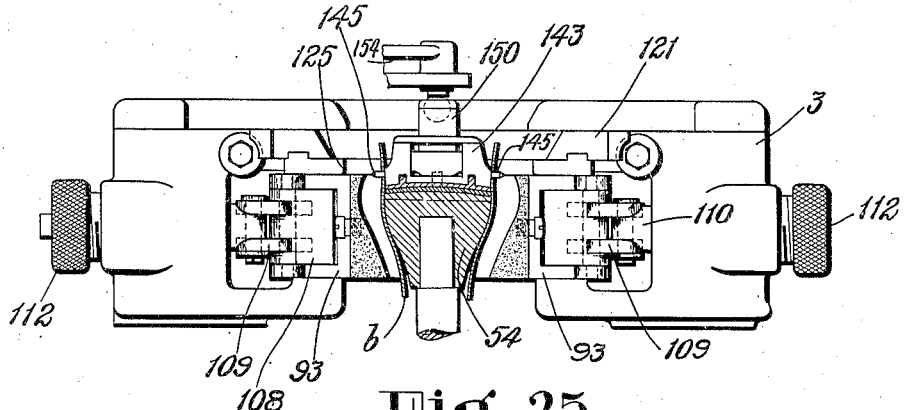
Fig. 25 is a front view of one of the shaping mechanisms, showing the form in section and away from upper shaping position with the upper in jigged position on the form.
Figure 26:
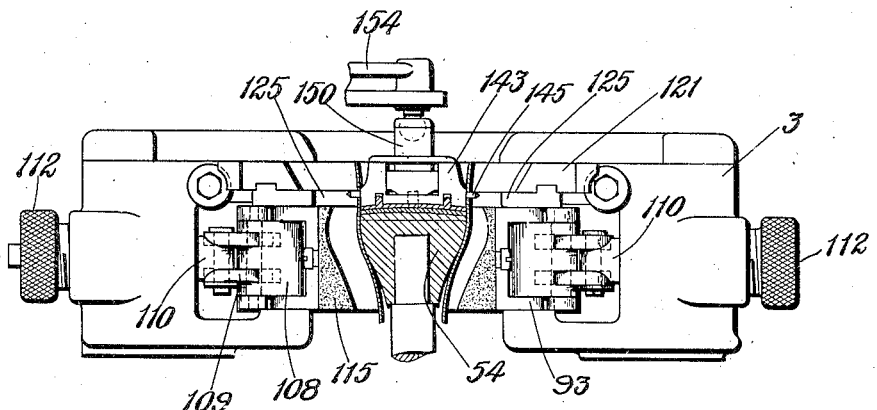
Fig. 26 is a view similar to Fig. 25, showing the form and jig as having been moved to upper shaping position.
Figure 37:
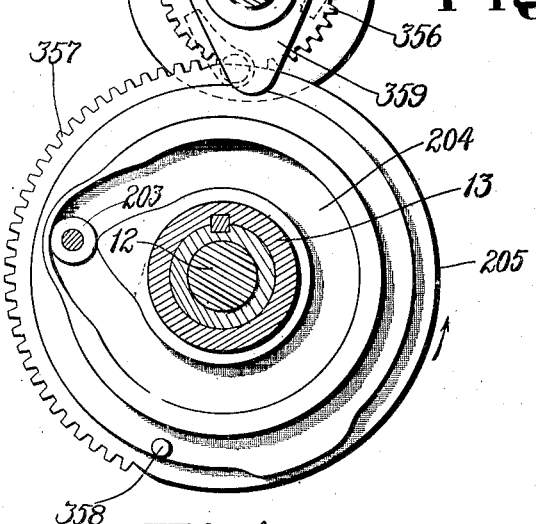
Fig. 37 is a section on the line 37—37 of Fig. 36.

The shoe parts are assembled and jigged relatively to each other and to the form when the form is in its outer or idle position as indicated by Fig. 25, because at that time the workman has convenient access to the form and the shoe parts which he assembles on the form, and when the form is moved inwardly to shaping position as indicated by Fig. 26, the jig head and the jigged shoe parts move with it. The form is moved automatically to and from operative position by a train of mechanism, a good practical form of which is shown by Figs. 1, 5 and 37.

Mounted for rocking movement on the support 56, Fig. 5, is a sleeve 197 through which extends a rod 198 having an adjusting hand wheel 199 on its outer end. The opposite end of the rod 198 is adjustably threaded to a rocking sleeve 200 mounted on the upper portion of an arm 201 pivotally supported at 202 on the machine frame. The arm 201 has a pin or roll 203 which rides in a cam path 204, Fig. 37, formed in the face portion of a cam 205 mounted upon the associated sleeve 13, the construction being such that when the machine is treadled to start one of the shaping mechanisms into operation after the shoe parts have been jigged on the form, the cam path 204 will move the support 56 and the form 54 into operative relation to the outer shaping instrumentalities and hold them there.

Figure 27:
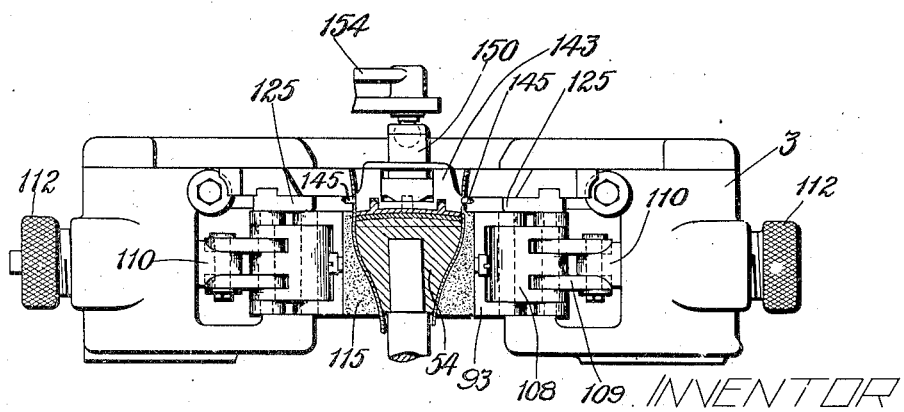
Fig. 27 is a view similar to Fig. 26, showing the end band closed about the end of the shoe upper.

When the form is moved as described, the jig moves with it and continues to hold the shoe parts in their jigged position until the end band clamps the shoe upper about the form, as indicated by Fig. 27, and since the upper is then maintained in its jigged relation to the shaping instrumentalities by being clamped between them, it is desirable that the jig head release the upper and retire from its seat to permit the margin of the upper to be wiped inwardly. To this end the yoke 190, hereinbefore described, is associated with the end band operating mechanism and becomes effective to trip the lock 182, 183, Fig. 13, when the end band has effectively taken control of and subjected the end of the shoe upper to pressure. In the persent instance, the yoke 190 is connected to the arm 85 which forms part of the train of mechanism for operating the end band, the construction being such that as the arm 85 moves contra-clockwise, Figs. 4 and 13, and the end band clamps the end of the shoe upper against the form, the swivel block 189 carried by the yoke 190 engages the trip nut 191 and withdraws the lock member 183 from its locking position, thereby releasing the rod 159 to the action of the springs 175 which move it upwardly. The upward movement of the rod first causes the block 150 to withdraw the jig pins from the upper and then raises the jig head from the work, whereupon the jig head is swung to its idle position under the impulse of the springs 162 and 163.

During the action of the wipers and the continuance of the shaping presure about the end of the shoe, the persent invention provides that the form 54 be additionally held or locked against the pressure of the band and the wipers. In the present instance this is effected by means of a latch device 206, Figs. 4 and 13, which is connected to the train of mechanism for operating the end band, and as shown is formed as a projection from the hub portion of the arm 85. Mounted upon the form support 56 are locking lugs 207, preferably two being employed, one at each side of the form support, as indicated in Fig. 2, and similarly the device 206 comprises duplicate latch members. As the form is moved into operative relation to the outer shaping instrumentalities, the locking lugs 207 assume a position below the latches 206, and when the end band is closed about the end of the shoe the latches 206 are turned downwardly into engagement with the lugs 207 and effectively prevent retrograde movement of the form during the shaping pressure and the operation of the wipers. When the end of the upper has been shaped and the end band is moved to release the pressure about the end of the upper, the latches 206 are moved in a direction to disengage the locking lugs 207 and permit the form support 56 to move into its outer or inoperative position.

In cases where it is desired to provide an upstanding flange portion on the margin of the upper adjacent to the rear terminal portions of the insole lip, the present invention provides that the lip of the insole be supported against the inwiping action of the wipers during the formation of the upstanding flange on the upper by the inward pressure of the wipers against the lip of the insole. One good form of means for this purpose is shown in Figs. 2 and 20 to 23. Pivotally mounted in a bearing 209 on the frame is a shaft 208, to one end of which is secured the hub portion 211 of a lip support carrier 210. To the opposite end of the shaft 208 is secured a collar 212, Fig. 20, from which extends an arm 213 having pivotally connected thereto at 214 an operating rod 215 which extends downwardly and at its lower end passes through a sleeve 216, Fig. 23, carried by an arm 217, which is pivotally mounted for rocking movement at 218. The arm 217 has a roll carrier 219 provided with a roll which rides in a cam path 220 formed in the face of a cam 221 secured to the associated sleeve 13, before described.

Figure 20:
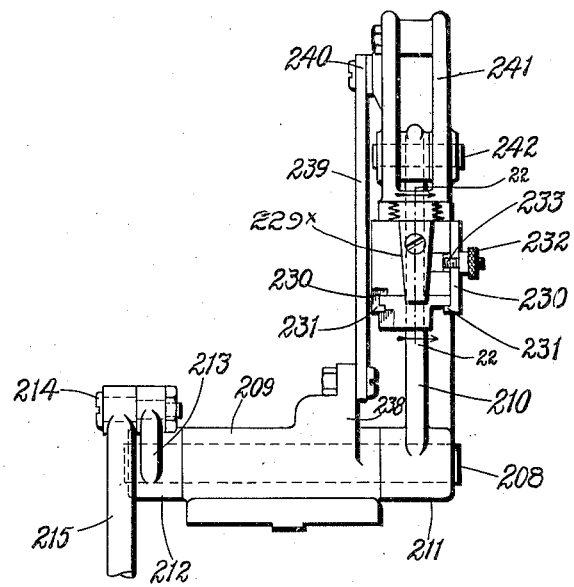
Fig. 20 is a side elevation of the insole lip support and associated means for backing up the lip or rib of the insole during the action of the wipers.
Figure 21:
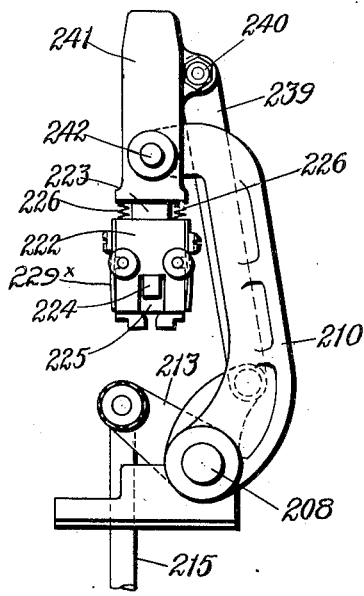
Fig. 21 is a front elevation of the mechanism shown in Fig 20.
Figure 22:
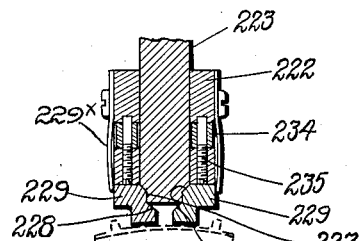
Fig. 22 is a section on line 22—22 of Fig. 20.
Figure 23:
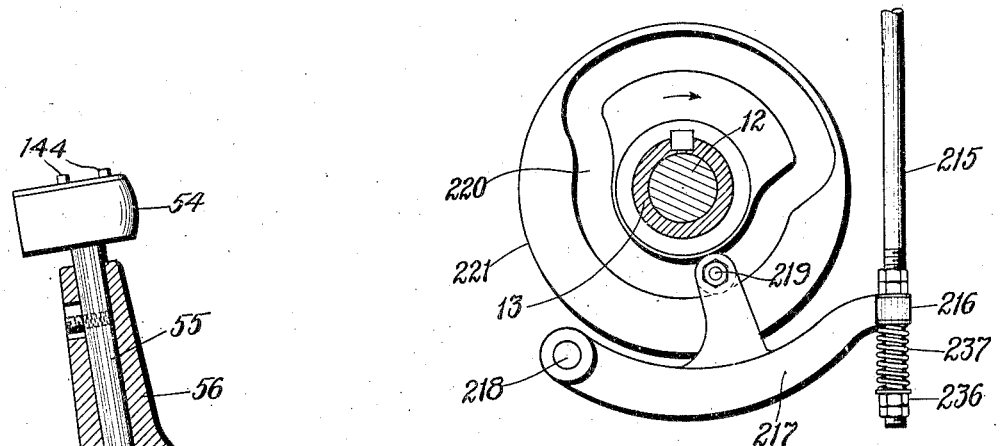
Fig. 23 is a detached detail partly in section showing the operating rod for the insole lip support and its operating cam.
Figure 28:
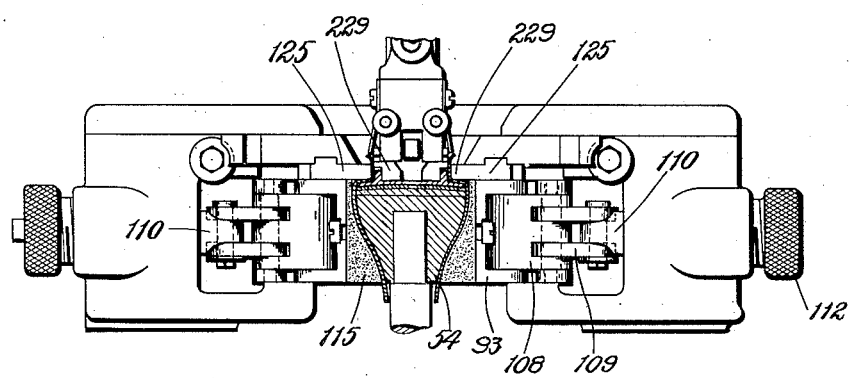
Fig. 28 is a view similar to Fig. 27, showing the insole lip support backing up the lip of the insole as the wipers are moved inwardly.
Figure 29:
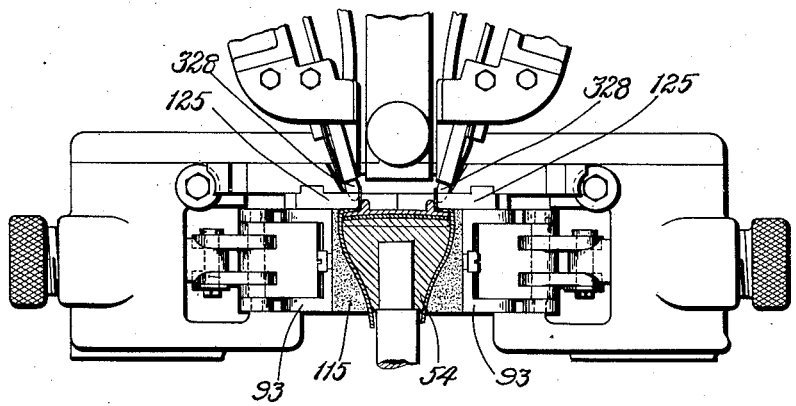
Fig. 29 is a front view similar to Fig. 28, with the jig and the insole lip support removed from operative position and showing the fastening mechanism in position for fastening the shaped upper.

The lip support comprises a block 222 connected to a supporting plunger 223 for movement with and relatively to the plunger. As shown, the plunger 223 has a cross-pin 224 which engages in a slot 225 formed in the block 222, Fig. 21, and springs 226 normally act to hold the block in its lower position on the plunger with permissive relative movement of the plunger downwardly. The lower end of the plunger 223 has inclined portions 227 which are adapted to engage inclined portions 228 on lip support members 229, the construction being such that upon downward movement of the plunger relatively to the members 229, in opposition to springs 229*, the members will be separated to position them for engagement with the inner surfaces of the terminal portions of the insole lip, as indicated by Fig. 28. The lip support members are mounted in the block 222 for separating movement by means of side pieces 230 having inturned lower ends 231 which form guideways for the members, as indicated in Fig. 20. The side pieces 230 are held to the block 222 by thumb nuts 232 which are threaded to stems 233 carried by swivel pieces 234 held in the block pivotally upon the unthreaded portions of holding screws 235.

To provide for different thicknesses of stock and to effect yielding engagement of the lip support members 229 with the insole, the rod 215 is continued downwardly through the sleeve 216 and at its lower end has adjustably secured thereto nuts 236 between which and the sleeve 216 is interposed a spring 237, the construction being such that when the rod 215 is moved downward and the lip supports find a seat upon the insole, provision is afforded for relative yield between the operating arm 217 and the rod 215 by the interposed spring 237.

Extending from the bearing 209 is a lug 238 to which is pivoted a controlling arm 239, the upper end of which is pivotally connected at 240 to an upwardly extending plunger carrier 241 for the plunger 223, the carrier 241 being pivoted at 242 on the lip support carrier 210. This construction, and the timing of the operating means, are such that after the form with the jigged shoe parts thereon has been moved inwardly and the jig head has been released, the lip support is automatically moved and seated upon the insole between the rear end portions of the insole lip and expanded to support the lip during the inwiping action of the wipers.

In the present instance the counter stiffener $c$ is shown as having been previously shaped or molded with a flange portion $d$ to overlie the heel seat of the insole, and with upstanding front marginal edges or wings $e$. When the marginal portions of the upper are wiped in as described, the upstanding wings $e$ of the counter stiffener and adjacent portions of the upper are pressed against the lip of the insole and afford means for subsequently connecting the insole lip to the stiffener and upper.

When the end of a shoe upper has been shaped, the present invention contemplates that it be secured to the insole, the machine illustrated having means for securing the shoe parts together while they are held by the shaping instrumentalities. For the accomplishment of this result, in the machine herein shown, a single fastening mechanism is constructed and arranged to be automatically moved into fastening relation to the different pieces of work while they are supported in their different locations. This is an important feature of the invention and not only simplifies the mechanical construction of the machine, but gives the workman unobstructed access to the shoe parts in assembling them on the form and during the shaping operation.

As shown, the single fastening mechanism occupies an initial position between the locations of the two sets of shaping instrumentalities and is automatically moved into fastening relation to the work at either location as an incident to the operation of the shaping instrumentalities in that location. The fastening mechanism shown is of the gang tack driving type adapted to drive tacks into the overlaid margin of the upper and into the insole, and in order that the tacks may be properly clinched after passing into the insole, the form 54 may be made of metal or may be provided with a hardened metal facing plate $f$, Fig. 39.

Figure 33:
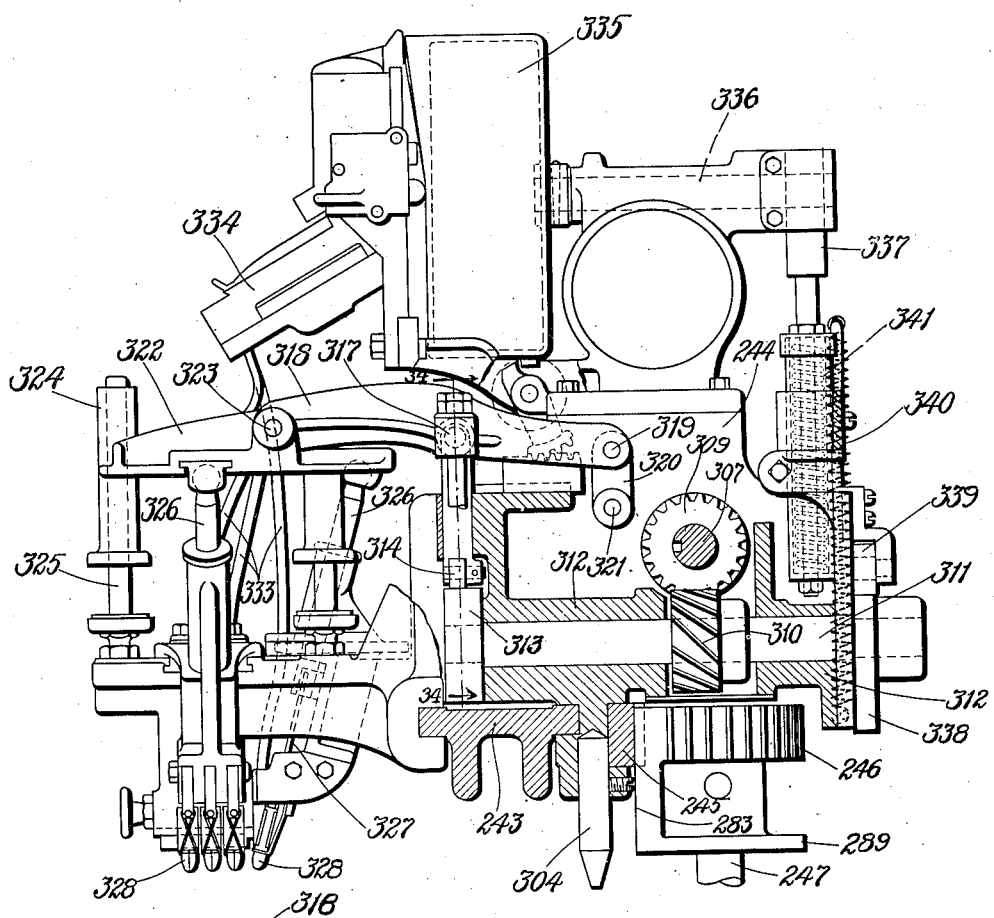
Fig. 33 is a side elevation of the fastening mechanism for fastening the end of an upper shaped by either shaping mechanism, certain of the parts being broken away to show parts beyond.
Figure 35:
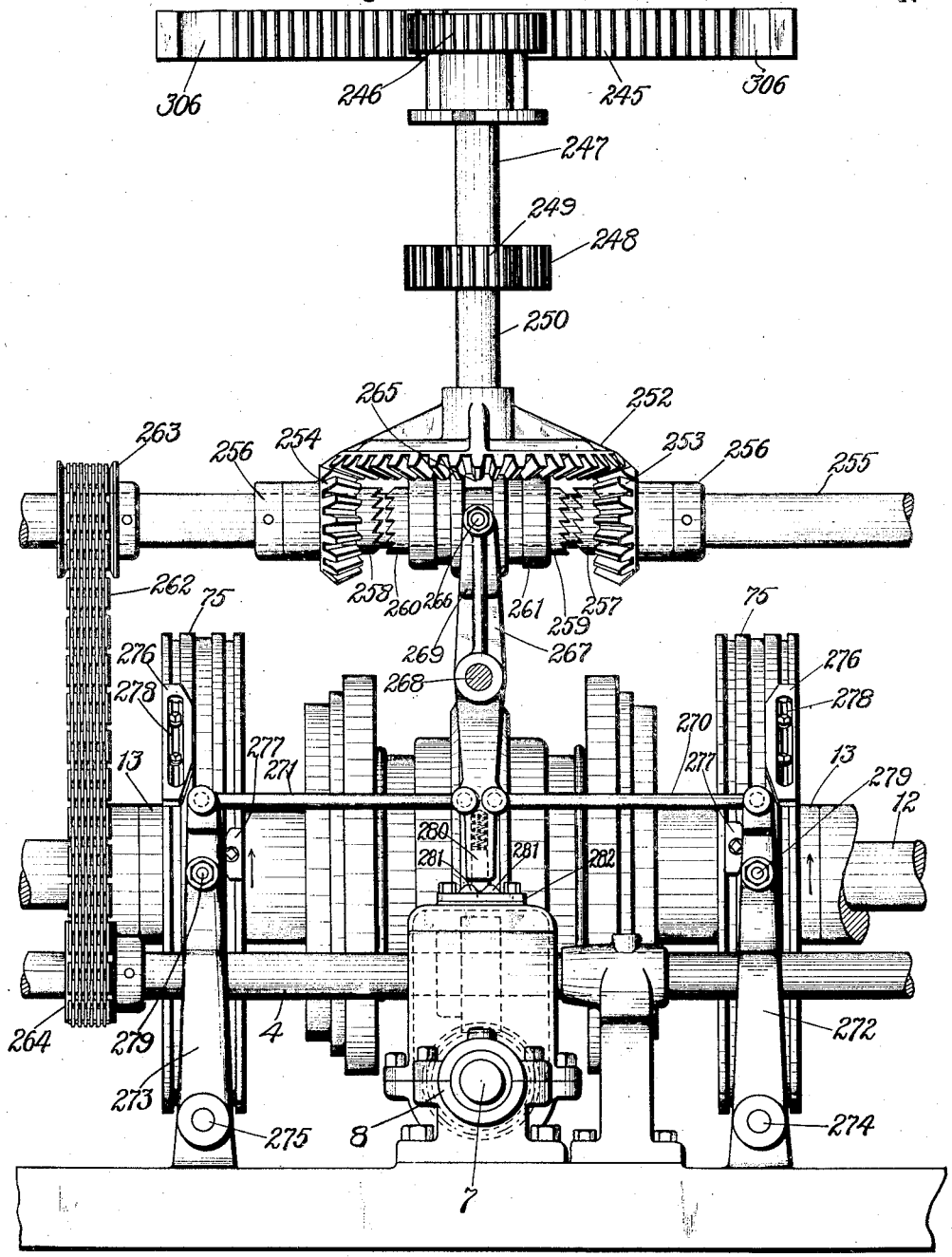
Fig. 35 is an enlarged rear elevation showing more particularly the means for moving the fastening mechanism to the position of either one of the upper shaping mechanisms.

The fastening mechanism proper is carried by a supporting guide 243, Figs. 1, 2 and 33, which extends transversely of the machine frame above the top or table 3, and is movable in a predetermined path along the guide to the different locations of the work by trains of mechanism, one good practical form of which is best indicated by Fig. 35.

The fastening mechanism shown comprises a frame 244 and a gang tacker for driving gangs of tacks into the overwiped margin of the upper and the insole. The frame 244 carries a rack 245, the teeth of which are adapted to be engaged at times by teeth 246 (Figs. 6 and 33) of a mutilated gear which is mounted on an operating shaft 247 supported in and rising from the machine frame. The lower end of the shaft 247 is provided with a toothed wheel 248 which is operatively engaged by an adjacent toothed wheel 249 mounted upon a shaft 250 carried in a suitable bearing 251, Fig. 4, rigid with the machine frame. The lower end portion of the shaft 250 (see Fig. 35) is provided with a beveled gear 252 which is in continuous engagement with opposed beveled gears 253 and 254 loosely mounted on a continuously rotating shaft 255. Collars 256 on the shaft 255 serve to hold the beveled gears 253 and 254 in operative connection with the beveled gear 252.

The two beveled gears 253 and 254 are provided with means for selectively connecting them to the shaft 255 for rotative movement therewith, and for disconnecting them from the shaft. As shown, the gears 253 and 254 have hub portions 257 and 258 formed with clutch teeth which are adapted to be engaged with the opposed clutch hubs 259 and 260 of a clutch member 261, which is mounted for longitudinal movement on and is splined to the continuously rotating shaft 255, the construction being such that when the clutch member 261 is moved along the shaft from its central position it will be clutched to one or the other of the beveled gears 253, 254 for moving the fastening mechanism from its inital position into fastening relation to a shoe in one or the other of the locations of the shaping mechanisms and then back again to initial position, as will more fully appear. The shaft 255 is driven by a sprocket chain 262, Fig. 35, which passes over a sprocket wheel 263 on the shaft 255 and also over a sprocket wheel 264 mounted on the constantly rotating shaft 4.

The clutch member 261 is actuated from time to time to connect one or the other of the beveled gears 253, 254, to the shaft 255 for effecting the described movements of the fastening mechanism, and one good form of means to this end is best indicated in Fig. 35. The clutch member 261 has a circular grooved portion 265 which is engaged by pins or rolls 266 carried by a shifting lever 267 pivotally supported at 268. The pins or rolls 266 are shown as carried by a yoke 269 formed as part of the shifting lever 267, and at the end opposite the yoke the lever 267 is connected to two rods 270 and 271, the other ends of the rods being connected to the upper end portions of levers 272 and 273, respectively, which are pivotally mounted at fixed points 274 and 275 on lugs rising from the machine frame, the construction being such that upon endwise movement of either of the rods 270 ar 271 the clutch member 261 will be actuated to effect operative engagement of one or the other of the beveled gears 253, 254, with the constantly rotating shaft 255.

Since the fastening mechanism is to be moved from its initial position into fastening relation to a shoe at either one of the locations of the shaping mechanisms, then be brought to rest for the fastening operation, and finally returned to its initial position, the two rods 270 and 271 are placed under control of throw-in and throw-out cams which are associated with the sleeves 13. The cam carriers 75, before described as secured to the sleeves 13, are each provided with a pair of throw-in cams 276, Figs. 3 and 35, and are similarly provided each with a pair of throw-out cams 277. The throw-in cams are adjustably secured to the cam carriers, and to this end are provided with slots 278 through which pass securing bolts.

Each of the levers 272 and 273 has a pin or roll 279 which, when the corresponding cam carrier 75 is rotated by its associated sleeve, is at the proper time in the cycle first engaged by a throw-in cam to cause the fastening mechanism to be moved automatically into fastening relation to a shoe shaped by one of the shaping mechanisms. When the fastening mechanism has reached the position mentioned, an associated throw-out cam 277 acts upon the roll 279 to bring the fastening mechanism to rest. When the fastening operation has been completed and the fastening mechanism is to be returned to its initial position, the other roll 279 is engaged by the other throw-in cam, and when the fastening mechanism has reached its initial position, the other throw-out cam acts upon the roll to bring the fastening mechanism to rest.

It may be advantageous in some cases to hold the clutch shifting lever 267 from movement when it is in either its idle or its driving position, and for this purpose the lower end portion of the lever is provided with a spring actuated plunger 280, Fig. 35, adapted to engage between and at either side of lugs 281 supported by a bracket 282 mounted on the machine frame.

When the fastening mechanism has been moved into fastening relation to either of the shaping mechanisms and returned to its initial position, it is desirable that any overthrow due to the momentum of the moving parts be avoided. As a convenient means to this end, the gear 246 is provided with an untoothed portion 283 which, when the fastening mechanism is in its initial position, engages a correspondingly curved untoothed portion 284 of the rack 245, Fig. 6. In order to insure that the gear 246 will always start from the same position, a controlling device is provided, comprising a spring actuated plunger 285, Fig. 6, supported in a fixed bracket 286 which is socketed to receive the plunger 285 and also a spring 287 which normally holds a roll 288 carried by the plunger in engagement with a flange 289, Figs. 6 and 33, connected to or formed as part of the gear 246. The flange 289 is provided with a V-shaped recess 290, Fig. 6, which, when the gear 246 has moved the fastening mechanism to its initial position, is brought opposite the roll 288 of the plunger, which thereupon enters the recess and serves to lock the gear 246 from further rotative movement.

When the fastening mechanism has been moved to the location of either of the shaping mechanisms, the present invention contemplates that it be moved downwardly into driving position; and where the fastenings consist of tacks or the like, as shown in the present instance, the tack holding nozzles are preferably lowered into or placed closely adjacent to the perforations or openings 127 in the wipers, in order that the tacks may be driven through the wipers into the upper and the insole when the wipers are in their inwiping position. The support 243 on which the fastening mechanism slides is carried by side rods 291, one at each side of the machine frame, and is secured to the upper end portions of the rods as indicated in Fig. 1. The rods 291 are guided for vertical movement in bearings 292 and 293, and below the bearing 293 each of the side rods 291 is provided with adjustable collars or nuts 294, between which and the socketed support 295, Fig. 5, is interposed a counterbalancing spring 296, the construction being such that while the fastening mechanism is carried by the support 243, which is itself carried by the side rods 291, the weight of the fastening mechanism is counterbalanced by the springs 296.

Each of the side rods 291, Figs. 1 and 5, is provided with a series of rack teeth 297 which are engaged by the teeth of a segment 298 carried by a segment arm 299 pivotally supported on the dead shaft 90 hereinbefore described. The segment arm 299 has extending therefrom a pin or roll 300, Figs. 1 and 5, which travels in the cam path 301 of a cam 302 mounted on a shaft 303, to which rotative movement is imparted periodically upon the operation of either one of the shaping mechanisms, as will presently be described, the construction being such that when the fastening mechanism has been moved into operative relation to a shoe at the location of either of the shaping mechanisms, the toothed segment is operated to lower the fastening mechanism into track driving position, and when the tacks have been driven, the fastening mechanism is raised from its tack driving position.

When the fastening mechanism is lowered into tack driving position and the tack driving nozzles approach the holes or openings in the wipers, a positioning pin 304, which extends from the frame of the fastening mechanism, enters a locking recess 305, Fig. 4, formed in the top or table 3, thus insuring proper positioning of the fastening or tack driving mechanism and locking it for the tack driving operation. As a further insurance of properly locating the fastening mechanism when it is moved to the location of either one of the shaping mechanisms, the rack 245 may be provided with untoothed portions 306, Fig. 35, which will engage the untoothed portion 283 of the gear 246 at such times; and since the fastening mechanism is lowered and then raised at the fastening position, the untoothed portion 283 of the gear 246 is elongated as indicated in Figs. 1 and 4, so that the untoothed portion of the rack may ride along the untoothed portion of the gear as it is lowered and raised.

Figure 34:
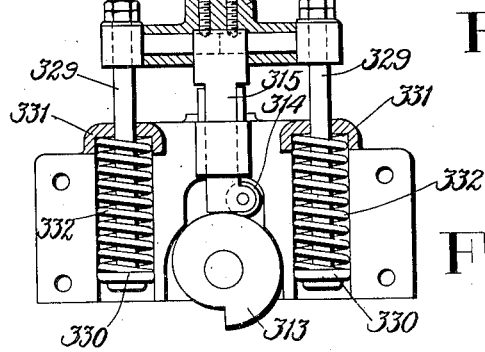
Fig. 34 is a section on line 34—34 of Fig. 33.

As shown, the fastening mechanism is of the gang tacker type, generally similar to that shown and described in the patent to McFeely, No. 1,129,882 granted on March 2, 1915, except as modified by the present invention. The side rods 291 carry a shaft 307, Figs. 1, 4 and 34, which extends between and is supported by bearings in arms 308 carried by the rods, and for identification the shaft 307 will be herein called the "tack driving shaft." The shaft 307 has splined thereto a gear 309, Fig. 33, which is movable longitudinally along the shaft with the frame 244 of the fastening mechanism and is rotatable with the shaft. The teeth of the gear 309 are preferably inclined, and engage similarly inclined teeth of a gear 310 mounted on a shaft 311, Fig. 33, which is carried in bearings 312 formed in the frame of the fastening mechanism. Mounted on the shaft 311 is a lifting cam 313 on which rests a roll 314 carried by a slide 315 depending from a tacker arm 318. The tacker arm 318 is connected at one end 319 to a link 320 pivoted at 321 to the frame of the fastening mechanism. The arm 318 carries a driving plate 322 which is pivotally connected to it at 323 and is guided in its up and down or driving and retracting movements by guide sleeves 324 which slide upon guide rods 325 secured at their lower ends to the frame of the fastening mechanism.

The driving plate 322 has connected thereto driver bars 326, Fig. 33, each of which carries a series of tack drivers 327. In the machine shown three drivers are provided for each side driver bar and two for the rear driver bar for driving a series of tacks through tacker nozzles or tack holders 328. The driving arm 318 receives its driving impulse, in the present instance, from rods 329, Fig. 34, which are mounted in swivel blocks 317 at the opposite sides of the arm 318 and have secured to their lower ends collars 330 between which and the upper walls of sockets 331 are interposed driving springs 332, the construction being such that when the shaft 311 is rotated, the lifting cam 313 puts the driving springs 332 under tension, and then releases them as the roll 314 drops from the high part of the cam to cause them to operate the arm 318 and drive the tacks.

The tacks are fed to the nozzles 328 through a series of conduits 333, Fig. 33, which are supplied from a distributing or separating mechanism 334 to which tacks are delivered from a hopper 335 substantially as described in the McFeely patent hereinbefore mentioned. In the present instance the hopper is provided with a shaft 336 which is oscillated by a reciprocating rack moved in one direction by a cam 338 on the shaft 311 on which rests a roll 339, and in the opposite direction by springs. The roll 339 is carried by a frame 340 and imparts movements yieldingly to the rack 337 through the interposition of a spring 341. The tack supply and the means for operating the hopper and the separator to deliver tacks to the tack driving nozzles may be substantially the same as similar parts described in the McFeely patent.

The tack driving shaft 307 in driven through a train of mechanism connected to the shaft 303, Fig. 1. In the present instance the shafts 307 and 303 have mounted for pivotal movement thereon arms or casings 342 and 343 respectively, Fig. 1, which are pivotally connected at their meeting ends by a short sprocket carrying shaft 344. The shaft 303 carries a sprocket wheel 345, the shaft 344 carries duplicate sprocket wheels 346, and the shaft 307 carries a sprocket wheel 347. Connecting the sprocket wheel 345 to the corresponding sprocket 346 is a sprocket chain 348, and similarly between the sprocket 347 and the associated sprocket wheel 346 is a sprocket chain 349, the construction being such that rotative movement of the shaft 303 causes rotative movement of the tack driving shaft 307. When the fastening mechanism is raised and lowered, the arms 342 and 343 swing with a toggle-like action and maintain the driving connections in driving relation during such movements.

Figure 38:
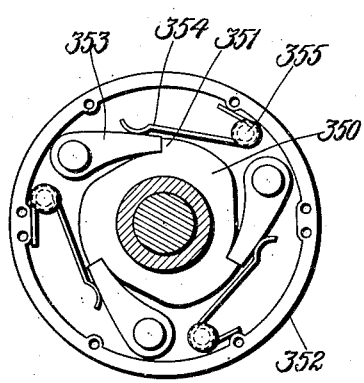
Fig. 38 is a section on the line 38—38 of Fig. 36.

For imparting movement at the proper time in the cycle to the shaft 303, through which the tacker mechanism is moved vertically to and from driving position and through which also the tacks are driven, the following mechanism is provided, as shown in Figs. 36, 37 and 38. Secured to the normally idle shaft 303 are the duplicate ratchets 350, Figs. 36 and 38, having shouldered portions 351, one of said ratchets being provided for co-operation with each of the sleeves 13. Loosely mounted upon the shaft 303 adjacent to each ratchet is a pawl carrier 352 which carries a series of pawls 353, Fig. 38, each of which is normally under the influence of a spring 354 tending to hold the end of the pawl in front of the teeth or shoulders 351 of the ratchet. Three ratchet teeth and three pawls are shown in the present instance, but obviously the number may be varied to suit different circumstances of use. As shown, the springs 354 are of leaf type, and are each supported by a pin 355 mounted upon the pawl carrier 352. The hub portion of the pawl carrier 352 has secured to it a gear 356, Fig. 36, which is arranged to be rotated by a mutilated gear 357 carried by the associated sleeve 13. When the untoothed portion of the mutilated gear 357, Fig. 37, is passing the gear 356, the latter, and perforce the shaft 303, remain at rest; but when the teeth of the mutilated gear engage the teeth of the gear 356, the latter and through it the pawl carrier and ratchet and the shaft 303 are rotated.

To insure that the ends of the pawls 353 shall properly engage the teeth or shoulders of the ratchet when the gear 356 is operated as described, the construction shown provides that the shaft 303 shall be given a slight preliminary forward movement. To this end, the face of the mutilated gear 357 carries a pin 358, Figs. 36 and 37, which as the gear rotates contra-clockwise, viewing Fig. 37, engages the end of a finger 359 depending from and secured to the shaft 303, the arrangement being such that just before the teeth of the mutilated gear 357 come into engagement with the teeth of the gear 356, the pin 358 strikes the finger 359 and imparts to the shaft a slight forward movement, so that should any of the pawls have failed to drop into operative position in a previous movement of the ratchet through the operation of the other pawl and ratchet mechanism, they will then drop in front of the shoulders or teeth, and when the gear 356 is rotated by the mutilated gear, the pawls will actuate the shaft 303. Such movement of the shaft effects first a downward movement of the fastening mechanism through the cam actuator segment 298, Fig. 1, when the mechanism is in operative relation to one of the shaping mechanisms, then through the operation of the shafts 307 and 311 causes the driving of the tacks, and thereafter imparts return upward movement to the fastening mechanism. It will be understood that the operation of each pawl and ratchet device effects a complete rotation of the shaft 303 and of the connected shafts 307 and 311.

In the use of the machine, as herein illustrated, the operator mounts a heel seat reinforcing piece and an insole upon the form which is appropriate for the work in hand, depending upon whether the shoe is a right or a left, in the location determined by the jig pins 144 which enter the jig holes previously formed in these parts. He then places the assembled upper materials about the form, turns the heel end portion of the lining inwardly over the form, and inserts a previously molded counter between the lining and the upper, pressing the assembled materials downwardly to seat the inturned margin of the lining and the flange of the counter on the bottom face of the insole. The jig head is then swung into position over the form and by depression of the jigging treadle is seated upon the counter flange and the insole in the location determined by the pins 144 which enter the corresponding openings in the jig head, the continued depression of the treadle serving to project the jig pins 145 and to effect the locking of the jig head in its operative position. The previously formed jig holes 146 in the margin of the upper are then utilized to mount the upper on the jig pins 145 which determine the position of the upper both heightwise of the form and peripherally about the form.

The different shoe parts, comprising the upper and the insole, having thus been assembled and jigged in relation to the form and to one another, the corresponding half of the machine is started in operation by depression of the appropriate starting treadle, the starting treadle for the other half of the machine being thereby locked to prevent its movement until after the operations upon the work in hand have been completed. Immediately upon the starting of the machine the cam 204 acts to swing the jack or shoe support, comprising the form 54, rearwardly and to carry the shoe into engagement with the heel band which is pressed back against the resistance of the spring 97, the jig head being carried rearwardly with the form in unvarying relation thereto by the action of the pins 144. The cam 92 then comes into play to close the heel band about the form and to clamp and shape the upper to the contour of the form. In the operation of the band closing means the locking members 206 are swung into operative position, and as soon as the upper has been firmly clamped about the form the jig head is released by its locking device, whereupon the jig pins are withdrawn from the jig holes in the upper and the jig head is lifted and swung to its idle position by the action of the springs. As the jig head is swung away from the work, the insole lip support comprising the lip supporting members 229 is swung inwardly over the form and downwardly upon the insole by the action of the cam 220, the lip supporting members being wedged outwardly into supporting relation to the rear end portions of the lip at the opposite sides of the insole. The wiper cam 142 then comes into action and imparts to the wipers a plurality of advancing and closing movements, alternating with partial retracting movements, as indicated by the configuration of the cam on Fig. 24. After the edges of the wipers have advanced and closed over the outer edge of the insole in their first operative movement, the cam 74 becomes effective upon the roll 71 to impart a slight upward movement to the form 54 which continues during the further wiper movements and serves gradually to increase the pressure of the wipers upon the margin of the upper materials over the bottom face of the insole. As the wipers are thus reciprocated their end portions 128 act to shape the margin of the upper in front of the heel seat in conformity to the angle between the feather and the lip of the insole and to form at each side an upstanding flange pressed inwardly in close relation to the counter flanges or wings and to the rear end portions of the insole lip. At the end of the last inward movement of the wipers they come to rest in fully closed position and are maintained in this position during the tacking operation.

Substantially at or near the end of the operative movements of the wipers the insole lip support is returned to its idle position, the clutch mechanism shown in Fig. 35 is rendered operative to carry the tacker mechanism from its intermediate idle position into position over the work, and the pawl and ratchet mechanism shown in Figs. 36 to 38 is thrown into operation to impart the required operative movements to the shafts 303 and 307 for effecting the downward movement of the tacker mechanism and the driving of the heel seat tacks through the openings in the wipers. The various parts of the machine comprising the tacker mechanism, the wipers, the heel band and the shoe support are then returned to their idle positions and the operator removes the work from the form.

In respect to the jigging of the upper and the insole the machine herein shown and described is constructed to carry out a method claimed in a copending application of George E. Warren, Serial No. 476,659, filed on June 11, 1921.

Having described the invention, what I claim as new and desire to secure by Letters Patent of the United States is:

1. In an upper shaping machine, the combination with upper shaping means, of upper positioning means constructed for engagement with positioning surfaces previously formed on an upper in predetermined relation to a characteristic of the upper to locate the upper both heightwise and peripherally in predetermined relation to the upper shaping means.

2. In an upper shaping machine, the combination with upper shaping means, of means for engaging jigging surfaces formed on an upper in different locations lengthwise of the upper to position the upper with respect to movement in different directions relatively to the upper shaping means.

3. In an upper shaping machine, the combination with upper shaping means, of means for jigging an upper in relation to said upper shaping means comprising members arranged to engage the upper in a plurality of jig holes formed in each side portion of the upper in different locations lengthwise of the upper.

4. In an upper shaping machine, the combination with means for shaping an end portion of an upper, of upper positioning means constructed for engagement with jigging surfaces formed on the upper at the end and at opposite sides of the end portion of the upper to locate the upper both heightwise and peripherally in predetermined relation to the upper shaping means.

5. In an upper shaping machine, the combination with means for shaping an end portion of an upper, of means for positioning the upper in predetermined relation to said upper shaping means, said positioning means being constructed for engagement with the upper in a jig hole formed substantially at the end of the upper and for additional engagement with the opposite side portions of the upper in locations spaced from said jig hole.

6. In an upper shaping machine, the combination with means for shaping an end portion of an upper, of means for jigging the upper in relation to said upper shaping means comprising members for engaging the upper in jig holes located respectively at the end and at opposite sides of the end portion of the upper.

7. In an upper shaping machine, the combination with means for shaping an end portion of an upper, of upper positioning means comprising a member constructed and arranged for engagement with the upper in a jig hole formed substantially at the end of the upper to locate the end of the upper in predetermined relation to the upper shaping means.

8. In an upper shaping machine, the combination with means for shaping the heel end portion of an upper, of means for jigging the upper in relation to said upper shaping means comprising members arranged to engage the upper in jig holes formed in its rear end at opposite sides of the back seam and in other jig holes located farther forwardly in the heel end portion of the upper.

9. In a machine of the class described, the combination with a form over which to shape an upper, of means for positioning the upper with its margin substantially perpendicular to the plane of the bottom face of the form, said positioning means being constructed for engagement with jigging surfaces on the upper to determine the location of the upper peripherally about the form and the extent of projection of its margin relatively to the plane of the bottom face of the form.

10. In a machine of the class described, the combination with a form over which to shape an upper, of means for positioning the upper with its margin substantially perpendicular to the plane of the bottom face of the form comprising a plurality of jig pins arranged to engage the upper in jig holes formed in its margin to locate the upper both heightwise and peripherally in predetermined relation to the form.

11. In a machine of the class described, the combination with a form, of means for jigging an upper in relation to said form comprising a plurality of jig pins arranged to project in directions transverse to the height of the form in position to enter jig holes in the upper and support the upper about the form.

12. In a machine of the class described, the combination with a form over which to shape an end portion of an upper, of means for jigging the upper in relation to said form comprising a plurality of jig pins arranged to project in directions transverse to the height of the form in different locations at the end and at opposite sides of the form in position to enter jig holes in the margin of the upper and support the upper with its margin substantially perpendicular to the plane of the bottom face of the form.

13. In a machine of the class described, the combination with a form over which to shape the heel end portion of an upper, of means for jigging the heel end portion of the upper in relation to said form comprising a plurality of jig pins arranged to engage the upper in jig holes formed in different locations round its heel end portion to position the upper with its margin upstanding relatively to the bottom face of the form and projecting a predetermined distance beyond said face at the end and the sides of the form.

14. In a machine of the class described, the combination with a form, of means for positioning an upper in relation to said form comprising a device adapted to be positioned over the bottom face of the form and constructed for engagement with positioning surfaces on the upper to locate the upper with respect to movement in different directions relatively to the form.

15. In a machine of the class described, the combination with a form, of means for positioning an upper in relation to said form comprising a jig head adapted to be positioned over the bottom face of the form and provided with members for engaging the upper in jig holes formed in the margin of the upper.

16. In a machine of the class described, the combination with a form over which to shape the heel end portion of an upper, of a jig head adapted to be seated over the bottom face of the form, said jig head being provided with a plurality of jig pins arranged to project outwardly through jig holes in the upper at the rear end and at opposite sides of the form.

17. In a machine of the class described, the combination with a form, of a jig head adapted to be positioned over the bottom face of the form, said jig head having a plurality of jig pins arranged to project in directions transverse to the height of the form in position to enter jig holes in the margin of an upper and support the upper with its margin upstanding relatively to the bottom face of the form.

18. In a machine of the class described, the combination with a form, of means for positioning an upper in relation to said form comprising a jig head having a plurality of jig pins movably mounted thereon and adapted to be projected into position to enter jig holes formed in the upper and subsequently to be retracted from said jig holes.

19. In a machine of the class described, combination with a form, of means for positioning an upper in relation to said form comprising a jig head adapted to be positioned over the bottom face of the form, said jig head having a plurality of jig pins movably mounted thereon, and means associated with said jig pins for moving them outwardly into position to enter jig holes formed in the upper and for retracting them from said jig holes.

20. In an upper shaping machine, the combination with upper shaping means, of a device for jigging an upper in relation to said upper shaping means, said device being mounted for movement into and out of operative jigging position.

21. In an upper shaping machine, the combination with upper shaping means, of means for jigging an upper in relation to said upper shaping means comprising a jig head provided with members for engaging the upper in jig holes formed in the upper, said jig head being mounted for movement into and out of operative jigging position.

22. In an upper shaping machine, the combination with a form, of means for jigging an upper in relation to said form comprising a device having members arranged to enter jig holes in the upper, said device being mounted for movement into and out of position over the bottom face of the form.

23. In a upper shaping machine, the combination with upper shaping means, of a device for jigging an upper in relation to said upper shaping means, said device being mounted for movement from an idle position into operative jigging position, and means automatically operative to return said device to its idle position after the jigging of the upper has been effected.

24. In an upper shaping machine, the combination with upper shaping means, of means for jigging an upper in relation to said upper shaping means comprising jig pins arranged to enter jig holes in the upper, and mechanism automatically operative to withdraw said pins from the jig holes and then to move them away from the upper shaping means after the jigging of the upper has been effected.

25. In an upper shaping machine, the combination with a form, of means for jigging an upper in relation to said form comprising a jig head mounted for movement into position over the bottom face of the form and provided with members for engaging the upper in jig holes formed in the upper, and means automatically operative to move said jig head away from the form after the jigging of the upper has been effected.

26. In an upper shaping machine, the combination with a form, of means for jigging an upper in relation to said form comprising a jig head mounted for movement into operative position over the bottom face of the form and having a plurality of jig pins movable outwardly into position to enter jig holes in the upper, and mechanism automatically operative after the jigging of the upper has been effected to withdraw said pins from the jig holes and to move the jig head away from the form.

27. In an upper shaping machine, the combination with upper shaping means, of means for jigging an upper in relation to said upper shaping means comprising a jigging device movable into and out of operative jigging position and having members for engaging the upper in jig holes formed in the upper, and means for disengaging said jigging device from the upper and for moving it out of its operative position after the jigging of the upper has been effected.

28. In an upper shaping machine, the combination with a form over which to shape an end portion of an upper, of means for jigging the upper in relation to said form comprising a jig head movable into and out of operative jigging position, treadle means for positioning said jig head in operative relation to the form, and means automatically operative after the jigging of the upper has been effected to move said jig head away from its operative position.

29. In an upper shaping machine, the combination with a form over which to shape an end portion of an upper, of means for jigging the upper in relation to said form comprising a jig head movable manually from an idle position to a position over the bottom face of the form, means for thereafter depressing said jig head into operative relation to the form, and means automatically operative after the jigging of the upper has been effected to return the jig head to its idle position.

30. In an upper shaping machine, the combination with a form over which to shape an end portion of an upper, of means for jigging the upper in relation to said form comprising a jig head movable into and out of operative relation to the form, means for locking said jig head in its operative position, and means automatically operative to release the jig head and permit it to move away from the form after the jigging of the upper has been effected.

31. In an upper shaping machine, the combination with a form over which to shape an end portion of an upper, of means for jigging the upper in relation to said form comprising a jig head movable into operative position over the bottom face of the form and provided with jig pins movable outwardly into position to enter jig holes in the upper, manual means for seating the jig head in operative position over the form and for then projecting said pins outwardly from the jig head, means for locking the jig head with its pins outwardly projected, and mechanism automatically operative after the upper has been jigged to retract said pins and then move the jig head out of its operative position.

32. In an upper shaping machine, the combination with a form over which to shape an end portion of an upper, of means for jigging the upper in relation to said form comprising a jig head movable manually from an idle position at one side of the form to a position over the form and provided with jig pins normally retracted and movable outwardly into position for engagement with the upper in jig holes formed in the upper treadle means for depressing said jig head into operative relation to the form, said treadle means being operative by continued movement to project the jig pins outwardly from the jig head, and means for subsequently withdrawing said pins from engagement with the upper and for then returning said jig head to its idle position.

33. In an upper shaping machine, the combination with a form over which to shape the heel end portion of upper materials including a counter having an inturned heel seat flange, of means for jigging the heel end portion of an upper in relation to said form comprising a jig head adapted to be seated over the bottom face of the form upon said counter flange and provided with a plurality of jig pins arranged to project outwardly for engagement with the upper in jig holes formed in the margin of the upper.

34. In an upper shaping machine, the combination with a form over which to shape an end portion of an upper, of means for jigging the upper in relation to said form comprising a jig head adapted to be positioned over the bottom face of the form, a plurality of jig pins movably mounted on said jig head and arranged to engage the upper in jig holes formed in the upper, and a spring controlled member on the jig head connected to said pins for maintaining them normally in retracted position and movable to project the pins into upper engaging position.

35. In an upper shaping machine, the combination with upper shaping means, of a jig head movable into operative relation to said upper shaping means and having jig pins movably mounted thereon, and means for projecting said pins from the jig head as an incident to the movement of the jig head into operative relation to the upper shaping means.

36. In an upper shaping machine, the combination with upper shaping means, of an upper positioning device constructed for engagement with an upper in jig holes in the upper to determine the position of the upper both heightwise and peripherally in relation to the upper shaping means, said device being movable into and out of operative relation to the upper shaping means, and means for predetermining the location of said device in relation to the upper shaping means.

37. In an upper shaping machine, the combination with a form over which to shape an upper, of means for jigging the upper in relation to said form, said jigging means being movable into and out of operative jigging position over the bottom face of the form, and means for predetermining the location of said jigging means in relation to the form for the jigging operation.

38. In a machine of the class described, the combination of a form and a jig head relatively movable into and out of operative relation to each other, said jig head having pins arranged to enter jig holes in an upper to jig the upper in relation to the form, and means for effecting an interlocking connection between said form and jig head to determine their relative positions for the jigging operation.

39. In a machine of the class described, the combination with a form over which to shape an upper, of a jig head movable into and out of operative relation to the form, said jig head having means for jigging the upper in relation to the form, and members projecting from the form and arranged to enter openings in said jig head to determine the relation of the jig head to the form.

40. In a machine of the class described, the combination with a form movable from an upper receiving position to carry the upper to a different position, of a device movable with the form and constructed to support the upper about the form and to gage its position in relation to the form.

41. In a machine of the class described, the combination with a form movable between different positions, of means for jigging an upper in relation to said form comprising jig pins arranged to enter jig holes in the upper, said jigging means being movable with the form to maintain the upper in its jigged relation to the form.

42. In a machine of the class described, the combination with means for operating on an upper, of a form movable from an upper receiving position to carry the upper to said operating means, and upper positioning means constructed to determine the position of the upper in relation to said form with respect to movement in different directions, said upper positioning means being movable with the form as the form is moved toward said operating means.

43. In an upper shaping machine, the combination with outer shaping means, of a form mounted for movement from an upper receiving position into operative relation to said outer shaping means, and means for jigging an upper in relation to said form in its upper receiving position and for maintaining the upper in jigged relation to the form as the form is moved into operative relation to the outer shaping means.

44. In an upper shaping machine, the combination with outer shaping means, of a form mounted for movement from an upper receiving position into operative relation to said outer shaping means, and a jig head adapted to be positioned over the bottom face of the form when the form is in its upper receiving position and provided with jig pins for engagement with the upper in jig holes formed in the upper, said jig head being movable with the form to maintain the upper in its jigged position as the upper is carried to the outer shaping means.

45. In an upper shaping machine, the combination with outer shaping means, of a form mounted for movement from an upper receiving position into operative relation to said outer shaping means, and a device for jigging an upper in relation to said form, said jigging device being mounted for movement from an idle position into operative relation to the form when the form is in its upper receiving position and for movement with the form to carry the upper to the outer shaping means.

46. In an upper shaping machine, the combination with outer shaping means, of a form mounted for movement from an upper receiving position into operative relation to said outer shaping means, and a jig head mounted for movement from an idle position to a position over the bottom face of said form when the form is in its upper receiving position and having jig pins for engagement with an upper in jig holes formed in the upper, said jig head being movable also with the form to carry the upper to the outer shaping means.

47. In an upper shaping machine, the combination with outer shaping means, of a form movable from an upper receiving position into operative relation to said outer shaping means, a device for jigging an upper in relation to said form, said device being movable to a position over the bottom face of the form when the form is in its upper receiving position and movable with the form to carry the upper to the outer shaping means, and means for locking said jigging device in operative relation to the form for movement with the form.

48. In an upper shaping machine, the combination with outer shaping means, of a form movable from an upper receiving position into operative relation to said outer shaping means, a jig head movable to a position over the bottom face of the form when the form is in its upper receiving position and having jig pins for engagement with an upper in jig holes formed in the upper, said jig head being movable with the form to carry the upper to the outer shaping means, and means for effecting an interlocking connection between the jig head and the form to maintain the jig head in predetermined relation to the form during the movement of the form.

49. In an upper shaping machine, the combination with outer shaping means, of a form movable from an upper receiving position into operative relation to said outer shaping means, a jig head movable to a position over the bottom face of said form and having jig pins for engagement with an upper in jig holes formed in the upper, said jig head being movable with the form to carry the upper to the outer shaping means, the form having pins arranged to enter recesses in the jig head to maintain the jig head in predetermined relation to the form during the movement of the form, and means for seating the jig head in operative relation to the form and for locking it while the form is in its upper receiving position.

50. In a machine of the class described, the combination with a form, of upper positioning means constructed for engagement with positioning surfaces on an upper to determine the position of the upper in relation to the form with respect to movement in different directions, means for clamping the upper about the form, and means automatically operative in time relation to the clamping of the upper to withdraw the upper positioning means from said positioning surfaces after the upper has been subjected to clamping pressure about the form.

51. In a machine of the class described, the combination with means for operating on an upper, of a form movable from an upper receiving position to carry the upper to said operating means, a device movable into operative relation to the form to gage the position of the upper in relation to the form while the form is in its upper receiving position, said device being movable with the form to carry the upper to the operating means, and mechanism automatically operative subsequently to withdraw said device from its operative position.

52. In a machine of the class described, the combination with a form and a co-operating member relatively movable to clamp an upper about the form, of means constructed for engagement with the upper in jig holes formed in the margin of the upper to determine the position of the upper both heightwise and peripherally of the form, and mechanism automatically operative after the upper has been subjected to clamping pressure about the form to withdraw the jigging means from said jig holes.

53. In a machine of the class described, the combination with a form and means for clamping an upper about the form, of a jig head adapted to be positioned over the bottom face of the form and having pins for engagement with the upper in jig holes formed in the margin of the upper, and mechanism automatically operative in time relation to the clamping of the upper to withdraw said pins from the jig holes and then to move the jig head away from the bottom face of the form.

54. In a machine of the class described, the combination with a form and means for clamping an upper about the form, said form being mounted for movement from an upper receiving position into operative relation to the clamping means, of a jigging device having means for engaging the upper in jig holes formed in the margin of the upper and movable with the form to carry the upper to the clamping means, and mechanism automatically operative after clamping pressure has been applied to the upper to withdraw said jigging means from its operative jigging position.

55. In a machine of the class described, the combination with a form and means for clamping an upper about the form, said form being movable from an upper receiving position into operative relation to the clamping means, of a jigging device arranged to be positioned over the bottom face of the form and mounted for movement with the form to carry the upper to the clamping means, said device having members for engaging the upper in jig holes formed in the margin of the upper to jig the upper in relation to the form, means for locking said device in operative relation to the form for movement to the clamping means, mechanism automatically operative after clamping pressure has been applied to the upper to release said jigging device, and spring means for imparting a retractive movement to said device when it is thus released.

56. In a machine of the class described, the combination with a form and means for clamping an upper about the form, of a jigging device adapted to be positioned over the bottom face of the form and provided with members for engaging the upper in jig holes formed in the margin of the upper to jig the upper in relation to the form, means for wiping the margin of the upper inwardly over the form, and mechanism automatically operative after clamping pressure has been applied to the upper to withdraw said jigging device from the path of movement of the wiping means.

57. In a machine of the class described, the combination with a form and means for clamping an upper about the form, of a jig head adapted to be seated over the bottom face of the form and having jig pins for engaging the upper in jig holes formed in the margin of the upper to jig the upper in relation to the form, wipers for wiping the margin of the upper inwardly over the form, and mechanism automatically operative after clamping pressure has been applied to the upper to withdraw said jig pins from the jig holes and to move the jig head out of the path of movement of the wipers.

58. In an upper shaping machine, the combination with a form, a band for embracing an upper about the form, and means for closing said band about the form, of means constructed for engagement with the upper in jig holes formed in the margin of the upper to jig the upper in relation to the form, a device for locking said jigging means in operative position, mechanism operated by said band closing means for releasing said jigging means, and spring means for moving said jigging means out of operative position when it is thus released.

59. In an upper shaping machine, the combination with an end embracing band, and a form mounted for movement from an upper receiving position to carry the upper toward said band, of a jig head mounted for movement from an idle position to an operative position over the bottom face of the form when the form is in its upper receiving position, said jig head being movable with the form to carry the upper toward said band and having a plurality of jig pins for engaging the upper in jig holes formed in the margin of the upper, wipers for wiping the margin of the upper inwardly over the form, and mechanism automatically operative prior to the operation of the wipers to withdraw said jig pins from the upper and to return the jig head to its idle position while the form remains in operative relation to the band and the wipers.

60. In a machine for assembling an upper with an insole and for fastening the upper to the insole, the combination with upper positioning means, of means for engaging positioning surfaces formed on the insole in predetermined relation to a characteristic of the insole to jig the insole in relation to said upper positioning means.

61. In a machine of the class described, the combination with a form positioned to serve as a permanent part of the machine in the manufacture of a plurality of shoes, of means for jigging an insole in relation to said form, and means for shaping an upper over the form and for fastening it to the insole.

62. In a machine of the class described, the combination with a form, of means for engaging positioning surfaces provided on an end portion of an insole in predetermined relation to a characteristic of the insole to position the insole both lengthwise and angularly in relation to the form, and means arranged in predetermined relation to said insole-positioning means for shaping an upper over the form and said end portion of the insole as thus positioned.

63. In a machine of the class described, the combination with a form, of members arranged for engagement with an insole in jig holes located in the heel end of the insole in predetermined relation to a characteristic of the insole for jigging the insole in relation to the form, and means for shaping an upper over the form and for fastening it to the heel end of the insole.

64. In a machine of the class described, the combination of a form having jig pins projecting from its bottom face in position to enter jig holes previously formed in an insole in predetermined relation to a characteristic of the insole, means for shaping an upper over the form and for wiping its marginal portion inwardly over the insole positioned by said jig pins, and means for fastening the margin of the upper to the insole.

65. In a machine of the class described, the combination with a form adapted to have an insole positioned over its bottom face, of means for jigging an upper in relation to said form, and means for shaping the upper over the form and for fastening it to the insole.

66. In a machine of the class described, the combination with a form adapted to have an insole positioned over its bottom face, of means for engaging positioning surfaces on an upper to position the upper both heightwise and peripherally in relation to the form, and means for shaping the upper over the form and for fastening it to the insole.

67. In a machine of the class described, the combination with a form adapted to have an insole positioned over its bottom face, of upper positioning means comprising jig pins arranged to engage an upper in jig holes formed in the upper to position the upper peripherally in relation to the form and to determine the extent of projection of the bottom edge of the upper beyond the plane of the insole, and means for shaping the upper over the form and for wiping its margin inwardly over the insole.

68. In a machine of the class described, the combination with a form adapted to have an insole positioned over its bottom face, of means for jigging an upper in relation to the form comprising a jig head movable into position over the insole on the form and provided with a plurality of jig pins for engagement with the upper in jig holes formed in the margin of the upper, and means for shaping the upper over the form and the insole in the relation determined by said jigging means.

69. In a machine of the class described, the combination with a form adapted to have an insole positioned over its bottom face, of a jig head movable into position close to the bottom face of the insole and provided with members for engaging an upper in jig holes formed in the upper to jig the upper in relation to the form, means for shaping the upper over the form and for wiping its margin inwardly over the insole, and means for moving said jig head away from the bottom face of the insole to permit the overwiping operation.

70. In a machine of the class described, the combination with a form adapted to have an insole positioned over its bottom face, of a jig head provided with pins for engagement with an upper in jig holes formed in the margin of the upper to position the upper in relation to the form, means for seating said jig head over the bottom face of the insole, means for clamping the upper about the form, wipers for wiping the margin of the upper inwardly over the margin of the insole, and mechanism automatically operative in time relation to the wipers to move said jig head out of the path of movement of the wipers.

71. In a machine of the class described, the combination with a form adapted to have an insole positioned upon its bottom face, of a jigging device arranged to be positioned over the insole for engagement with an upper in jig holes formed in the upper to position the upper in predetermined relation to the form, fastening means movable to a position over the insole for fastening the upper to the insole, and mechanism automatically operative to move said jigging device away from over the insole to permit the operation of the fastening means.

72. In a machine of the class described, the combination with a form over which to assemble an insole and upper materials including a counter having an inturned heel seat flange, of a jig head adapted to be seated upon said counter flange over the heel seat face of the insole and provided with jig pins for engagement with the upper in jig holes formed in the margin of the upper to position the upper in relation to the form, and means for shaping the upper over the form and for fastening it to the insole.

73. In a machine of the class described, the combination with a form adapted to have an insole positioned on its bottom face, of a jig head movable from an idle position to a position over the bottom face of the insole and provided with jig pins for engagement with an upper in jig holes formed in the upper to position the upper in relation to the form, means for clamping the upper about the form, mechanism automatically operative after clamping pressure has been applied to the upper to move said jig head away from over the insole, means for wiping the margin of the upper inwardly over the insole, and upper fastening mechanism movable into position over the insole for driving a plurality of fastenings to secure the upper to the insole.

74. In a machine of the class described, the combination of means for jigging different shoe parts to determine their relation to each other, and means for shaping one of said parts and for securing it to the other part in the relation thus determined.

75. In a machine for assembling an upper with an insole and for fastening the upper to the insole, the combination with upper fastening means, of means for jigging both the upper and the insole to determine the relation in which they are secured together by the upper fastening means.

76. In a machine of the class described, the combination with a form, of means for jigging both an upper and an insole in relation to the form, and means for shaping the upper over the form and for fastening it to the insole.

77. In a machine of the class described, the combination with a form, of members arranged to engage positioning surfaces on an upper and an insole to position both the upper and the insole with respect to movement in different directions in relation to the form, and means for shaping the upper over the form and for fastening the upper and the insole together in the relation thus determined.

78. In a machine of the class described, the combination with a form, of a plurality of jig pins arranged to enter jig holes previously formed in an insole to jig the insole in relation to the form, upper jigging means comprising pins arranged to enter jig holes previously formed in an upper to jig the upper in relation to the form, and means for shaping the upper over the form and for fastening it to the insole.

79. In a machine of the class described, the combination with a form, of means for jigging an insole in relation to the form, upper positioning means comprising a jig head movable toward and from the form, means for predetermining the relation of said jig head to the form, the jig head having members for engaging an upper in jig holes previously formed in the upper to determine the relation of the upper to the form, and means for shaping the upper over the form and for fastening it to the insole.

80. In a machine of the class described, the combination of a form having a plurality of jig pins projecting from its bottom face to enter jig holes in an insole to jig the insole in relation to the form, upper jigging means comprising a jig head movable toward and from the form and having openings arranged to receive said jig pins to determine its position in relation to the form, said jig head having members for engaging an upper in jig holes formed in the upper to position the upper in relation to the form, and means for shaping the upper over the form and for fastening it to the insole.

81. In a machine of the class described, the combination with a form over which to shape the heel end portion of an upper, said form being adapted to have an insole and an upper assembled thereon with the upper and the insole unattached to each other at the toe, means for jigging the upper and the insole in relation to the form, and means for shaping the heel end portion of the upper over the form and for fastening it to the insole.

82. In a machine of the class described, the combination with a form adapted to have an upper and an insole assembled thereon and movable from a work receiving position to carry the upper and the insole to a different position, of means for jigging both the upper and the insole and for maintaining them in jigged relation during the movement of the form.

83. In an upper shaping machine, the combination with outer shaping means, of a form mounted for movement from a work receiving position into operative relation to said outer shaping means and adapted to have an insole and an upper assembled thereon while it is in its work receiving position, and means for jigging the upper and the insole in relation to the form and for maintaining them in jigged relation to the form as the form is moved to carry the work to the outer shaping means.

84. In an upper shaping machine, the combination with outer shaping means, of a form mounted for movement from a work receiving position into operative relation to said outer shaping means, said form being provided with jig pins for engagement with an insole in jig holes formed in the insole, upper jigging means movable into position to jig an upper in relation to the form while the form is in its work receiving position and movable with the form to carry the work to the outer shaping means, and means for thereafter moving said upper jigging means out of its operative position to permit the upper to be shaped over the form and the insole.

85. In an upper shaping machine, the combination with outer shaping means, of a form mounted for movement from a work receiving position into operative relation to said outer shaping means, said form having a plurality of jig pins for engagement with an insole in jig holes provided in the insole, and upper jigging means comprising a jig head movable to a position over the bottom face of the insole and having members for engaging an upper in jig holes provided in the upper, said jig head being movable with the form to carry the work to the outer shaping means and having openings to receive the insole positioning pins to determine the position of the jig head in relation to the form and to assist in moving the jig head with the form.

86. In an upper shaping machine, the combination with means for working an upper into the angle between the feather and the lip of an insole, of an insole lip support mounted for movement in a predetermined path after the insole has been positioned in the machine into position to support the lip of the insole at the opposite sides of the shoe against inwardly directed pressure.

87. In an upper shaping machine, the combination with means for working an upper into the angle between the feather and the lip of an insole adjacent to the heel seat, of an insole lip support constructed for engagement with the inner face of the insole lip adjacent to the heel seat to support the lip against inwardly directed pressure, and mechanism automatically operative to move said lip support into operative relation to the insole.

88. In an upper shaping machine, the combination with means for working an upper into the angle between the feather and the lip of an insole, of an expansible insole lip support, and automatic means for moving said lip support into position upon the insole and for expanding it into supporting relation to the inner face of the lip at opposite sides of the insole.

89. In an upper shaping machine, the combination with means for working an upper into the angle between the feather and the lip of an insole, of an insole lip support comprising members movable apart into supporting relation to the inner face of the insole lip at the opposite sides of the insole, and controlling means movable heightwise of the shoe to position said members upon the bottom face of the insole and operative by continued movement in the same direction to force said members apart into supporting relation to the lip.

90. In an upper shaping machine, the combination with means for working an upper into the angle between the feather and the lip of an insole, of an insole lip support comprising members movable apart into supporting relation to the inner face of the insole lip at opposite sides of the insole, and means for moving said support to operative position comprising a member movable in wedging engagement with said lip supporting members to force them apart.

91. In an upper shaping machine, the combination with means for working an upper into the angle between the feather and the lip of an insole, of an insole lip support comprising members movable apart into supporting relation to the inner face of the insole lip at opposite sides of the insole, spring means for moving said members toward each other, and a wedge member movable between said lip supporting members to force them apart.

92. In an upper shaping machine, the combination with wipers for wiping an upper into the angle between the feather and the lip of an insole, and mechanism for fastening the upper in overwiped position, of an insole lip support constructed for engagement with the inner face of the insole lip to support the lip against the pressure of the wipers, and power means timed to move said insole lip support automatically into operative relation to the insole before the overwiping operation and to move said support away from the insole prior to the operation of the fastening mechanism.

93. In an upper shaping machine, the combination with means for working an upper into the angle between the feather and the lip of an insole, and fastening mechanism movable into position to fasten the upper to the insole, of an insole lip support constructed for engagement with the inner face of the insole lip to support the lip against inwardly directed pressure, and means automatically operative to withdraw said lip support from operative position prior to the movement of the fastening mechanism into upper fastening position.

94. In an upper shaping machine, the combination with means for working an upper into the angle between the feather and the lip of an insole, of an insole lip support constructed for engagement with the inner face of the lip of the insole at the opposite sides of the shoe to support said lip against inwardly directed pressure, a power driven cam, and connections between said cam and the insole lip support to move said support into and out of operative relation to the insole.

95. In an upper shaping machine, the combination with wipers for wiping an upper into the angle between the feather and the lip of an insole, of an insole lip support arranged to engage the inner face of the insole lip to support the lip against the pressure of the wipers, means automatically operative to withdraw said lip support from operative position after the wipers have wiped the upper inwardly, and mechanism for thereafter fastening the upper to the insole while the upper is held by the wipers.

96. In an upper shaping machine, the combination with a form adapted to have an upper and an insole assembled thereon, and means for wiping the upper inwardly over the form and into the angle between the feather and the lip of the insole, of a device adapted to be positioned over the bottom face of the form to jig the upper in relation to the form prior to the operation of the overwiping means, means for withdrawing said jigging device from operative position, an insole lip support constructed to support the lip of the insole against the inwardly directed pressure of the overwiping means, and means for moving said lip support into operative position after the jigging device has been withdrawn from its operative position.

97. In an upper shaping machine, the combination with means for working an upper inwardly over the heel seat face of an insole and into the angle between the feather and the rear end portions of the insole lip in front of the heel seat, of means constructed and arranged to support the rear end portions of the insole lip against inwardly directed pressure as the upper is worked inwardly into said angle.

98. In an upper shaping machine, the combination with means for wiping an upper inwardly over the heel seat face of an insole and into the angle between the feather and the rear end portions of the insole lip in front of the heel seat, of an insole lip support movable into and out of position between the rear end portions of the insole lip to support said portions of the lip against the inwardly directed pressure of the overwiping means.

99. In an upper shaping machine, the combination with means for wiping an upper over the heel seat face of an insole and into the angle between the feather and the rear end portions of the insole lip in front of the heel seat, of an insole lip support comprising members arranged to be forced apart into engagement with the inner face of the rear end portions of the insole lip to support the lip against the pressure of the overwiping means.

100. In an upper shaping machine, the combination with a form adapted to have assembled thereon an insole and upper materials including a molded counter provided with wings adapted to lie against the rear end portions of the insole lip, and wipers constructed to wipe the upper inwardly over the heel seat face of the insole and to mold the upper against said counter wings, of an insole lip support constructed and arranged to engage the rear end portions of the insole lip to support them against the molding pressure of the wipers.

101. In a machine of the class described, the combination with means for working the margin of an upper inwardly over a form at the opposite sides of the form, of mechanism for fastening the opposite side portions of the margin of the upper substantially simultaneously, said upper fastening mechanism being mounted for movement from an idle position substantially at one side of the form into upper fastening position.

102. In a machine of the class described, the combination with means for working the margin of an upper inwardly over a form about an end of the form, of a gang tacker mechanism constructed to drive a plurality of upper fastening tacks round the end and along the sides of the end portion of the form, said tacker mechanism comprising tack holders and tack drivers all mounted for movement as a unit from a position substantially at one side of the form into upper fastening position.

103. In a machine of the class described, the combination with means for working the margin of an upper inwardly over a form about an end of the form, of upper fastening mechanism comprising devices for driving fastenings substantially simultaneously round the end and along the sides of the end portion of the form, said devices being mounted for movement in fixed relation to one another in a path substantially parallel to the plane of the bottom of the form into and out of position over the bottom of the form.

104. In a machine of the class described, the combination with a shoe support and means for operating on shoe materials on said support, of a gang fastening mechanism comprising devices for driving fastenings at opposite sides of the bottom of the shoe, said fastening devices being mounted for movements simultaneously in the same directions laterally of the shoe into and out of position over the bottom of the shoe.

105. In a machine of the class described, the combination with a support for shoe materials including an upper and an insole, of fastening mechanism comprising devices for driving fastenings substantially simultaneously at opposite sides of the shoe bottom to secure the upper to the insole and means for holding the fastenings for the operation of said driving devices thereon, said driving devices and holding means being mounted for movement as a unit in substantially fixed relation to one another from a position exteriorly of the edge of the shoe bottom to a position over the insole.

106. In a machine of the class described, the combination with means for gathering and wiping the margin of the heel end portion of an upper inwardly over an insole, of a gang fastening mechanism for driving upper securing fastenings round the end and along the sides of the heel seat, said fastening mechanism being mounted for movement as a unit from a position substantially at one side of the heel seat into upper fastening position.

107. In a machine of the class described, the combination with means for gathering and wiping the margin of the heel end portion of an upper inwardly over an insole, of a gang fastening mechanism comprising devices for driving a plurality of upper securing fastenings round the end and along the sides of the heel seat, said devices being mounted for movement as a unit in fixed relation to one another in a path substantially parallel to the plane of the heel seat into and out of position over the heel seat.

108. In a machine of the class described, the combination with a shoe support and means for operating on shoe materials on said support, of a gang fastening mechanism for driving a plurality of fastenings at opposite sides of the bottom of the shoe, and a member on which said fastening mechanism is guided for substantially rectilinear movement as a unit into and out of position over the bottom of the shoe.

109. In a machine of the class described, the combination with means for shaping an end portion of an upper over a form, of mechanism for driving a plurality of upper securing fastenings at opposite sides of the end of the upper, and a support provided with a guideway extending in substantially parallel relation to the plane of the bottom of the form along which said fastening mechanism is movable as a unit into and out of position over the bottom of the form.

110. In a machine of the class described, the combination with means for working the margin of the heel end portion of an upper inwardly over an insole, of a gang fastening mechanism for driving a plurality of upper securing fastenings round the end and along the side of the heel seat, and a support provided with a guideway extending laterally of the insole, said fastening mechanism being movable as a unit along said guideway into and out of position over the heel seat.

111. In a machine of the class described, the combination with a work support, and means for operating on work on said support, of a gang fastening mechanism comprising separating means and driving means for fastenings both mounted for movement as a unit in a predetermined path toward and from operative fastening position.

112. In a machine of the class described, the combination with a shoe support, and means for operating on shoe materials on said support, of a gang tacking mechanism comprising a tack separator and multiple tack driving means both mounted for movement as a unit into and out of position for driving tacks in the bottom of the shoe.

113. In a machine of the class described, the combination with means for working the margin of an upper inwardly over a form, of a gang fastening mechanism comprising separating means and driving means for fastenings both mounted for movement together from a position substantially at one side of the form into position substantially over the bottom of the form.

114. In a machine of the class described, the combination with means for working the margin of the heel end portion of an upper inwardly over an insole, of a gang tacker mechanism comprising a tack separator and tack driving means movable together as a unit into and out of tacking position over the heel seat of the insole.

115. In a machine of the class described, the combination with means for working the margin of an upper inwardly over a form at the opposite sides of the form, of upper fastening mechanism comprising devices for driving fastenings substantially simultaneously in the opposite side portions of the margin of the upper, said devices being mounted for movement as a unit from a position substantially at one side of the form to a position over the bottom of the form and thence toward the bottom of the form prior to the fastening operation.

116. In a machine of the class described, the combination with means for working the margin of an end portion of an upper inwardly over a form, of a gang tacker mechanism for driving a plurality of upper fastening tacks round the end and along the sides of the form, said tacker mechanism being mounted for movement from a position substantially at one side of the form to a position over the bottom of the form and thence toward the bottom of the form prior to the tacking operation.

117. In a machine of the class described, the combination with a shoe support and means for operating on shoe materials on said support, of a gang fastening mechanism for driving fastenings at opposite sides of the bottom of the shoe, said fastening mechanism being mounted for movement as a unit in a predetermined path substantially parallel to the plane of the shoe bottom and then toward said plane into position for the fastening operation.

118. In a machine of the class described, the combination with means for working the margin of the heel end portion of an upper inwardly over an insole, of a gang fastening mechanism for driving upper securing fastenings round the end and along the sides of the heel seat, and a support on which said fastening mechanism is guided for positioning movement in a plane substantially parallel to the plane of the heel seat, said support being movable to carry the fastening mechanism toward the plane of the heel seat for the fastening operation.

119. In a machine of the class described, the combination with means for working the margin of an end portion of an upper inwardly over a form, of a gang tacker mechanism for driving a plurality of upper fastening tacks round the end and along the sides of the form, and a support having a guideway extending laterally of the form along which said tacker mechanism is movable to position it relatively to the form, said support being movable to carry the tacker mechanism toward the plane of the bottom of the form for the tacking operation.

120. In a machine of the class described, the combination with a work support, and means for operating on work on said support, of a gang fastening mechanism comprising separating means and driving means for fastenings mounted for movement as a unit in a predetermined path first in one direction and then in a different direction into position to operate on the work.

121. In a machine of the class described, the combination with means for working the margin of an end portion of an upper inwardly over a form, of a gang tacker mechanism comprising a tack separator and tack driving means mounted for movement as a unit in a predetermined path first along the plane of the bottom of the form and then toward said plane into position for driving tacks to fasten the margin of the upper.

122. In a machine of the class described, the combination with means for working the margin of the heel end portion of an upper inwardly over an insole, of a gang tacker mechanism for driving a plurality of upper fastening tacks round the end and along the sides of the heel seat, said tacker mechanism comprising a tack separator and tack driving means mounted for movement as a unit from a position substantially at one side of the insole to a position over the heel seat and thence toward the plane of the heel seat into position for the tacking operation.

123. In a machine of the class described, the combination with means for working the margin of the heel end portion of an upper inwardly over an insole, of a gang tacker mechanism for driving a plurality of upper fastening tacks round the end and along the sides of the heel seat, said tacker mechanism comprising a tack separator and tack driving means, and a support along which said separator and driving means are movable as a unit to a position over the heel seat, said support being movable to carry the tacker mechanism toward the plane of the heel seat into position for the tacking operation.

124. In a machine of the class described, the combination with a shoe support and means for operating on shoe materials on said support, of a gang fastening mechanism for driving fastenings substantially simultaneously at opposite sides of the bottom of the shoe, said fastening mechanism being mounted for positioning movement as a unit along the plane of the shoe bottom, and means automatically operative at a predetermined time in the cycle of the machine to impart said positioning movement to the fastening mechanism.

125. In a machine of the class described, the combination with means for working the margin of an end portion of an upper inwardly over a form, of a gang fastening mechanism for driving upper securing fastenings in the opposite side portions of the margin of the upper substantially simultaneously, said fastening mechanism being movable as a unit from a position substantially at one side of the form to a position over the bottom of the form, and means automatically operative at a predetermined time in the cycle of the machine to move said fastening mechanism into position over the bottom of the form.

126. In a machine of the class described, the combination with means for working the margin of the heel end portion of an upper inwardly over an insole, of a gang tacker mechanism comprising a plurality of tack driving devices for driving tacks round the end and along the sides of the heel seat, said devices being mounted for movement as a unit in fixed relation to one another to an operative position over the heel seat, and mechanism automatically operative at a predetermined time in the cycle of the machine to impart said positioning movement to the tacker mechanism.

127. In a machine of the class described, the combination with means for working the margin of an end portion of an upper inwardly over an insole, of a gang fastening mechanism for driving a plurality of upper securing fastenings at opposite sides of the end of the insole, and mechanism automatically operative at a predetermined time in the cycle of the machine to move said fastening mechanism as a unit first in a direction along the plane of the insole and then toward said plane to position it for the fastening operation.

128. In a machine of the class described, the combination with means for working the margin of the heel end portion of an upper inwardly over an insole, of a gang tacker mechanism for driving a plurality of upper fastening tacks round the end and along the sides of the heel seat, and mechanism automatically operative at a predetermined time in the cycle of the machine to move said tacker mechanism as a unit first inwardly to a position over the insole and then toward the plane of the insole to position it for the fastening operation.

129. In a machine of the class described, the combination with means for working the margin of the heel end portion of an upper inwardly over an insole, of a gang tacker mechanism for driving upper fastening tacks at opposite sides of the heel seat, a support on which said tacker mechanism is movable as a unit into and out of position over the heel seat, means for moving said tacker mechanism along said support to position it over the heel seat, and means automatically operative to move said support to carry the tacker mechanism toward the plane of the heel seat prior to the tacking operation.

130. In a machine of the class described, the combination with a work support, and means for operating on work on said support, of fastening mechanism mounted for positioning movement relatively to the work, and automatically controlled clutch means arranged to be actuated at a predetermined time in the cycle of the machine for imparting positioning movement to said fastening mechanism.

131. In a machine of the class described, the combination with a work support, and power operated means for operating on work on said support, of fastening mechanism mounted for positioning movement relatively to the work, a normally idle train of mechanism for imparting said positioning movement to the fastening mechanism, and an automatically controlled clutch for connecting said train of mechanism to the source of power at a predetermined time in the cycle of the machine.

132. In a machine of the class described, the combination with a shoe support, and power operated means for operating on shoe materials on said support, of fastening mechanism mounted for movement into and out of position over the bottom of the shoe, a normally idle train of mechanism for moving said fastening mechanism into position over the bottom of the shoe, and clutch means automtically operative in time relation to the means for operating on the shoe materials to connect said train of mechanism to the source of power.

133. In a machine of the class described, the combination with means for working the margin of the heel end portion of an upper inwardly over an insole, of a gang fastening mechanism for driving upper securing fastenings round the heel seat, said fastening mechanism being mounted for movement into and out of position over the heel seat, rack and pinion mechanism for moving said fastening mechanism into position over the heel seat, and automatically controlled power means for imparting movement to said rack and pinion mechanism at a predetermined time in the cycle of the machine.

134. In a machine of the class described, the combination with a shoe support, and means for operating on shoe materials on said support, of fastening mechanism movable into and out of position over the bottom of the shoe, and automatically controlled clutch means arranged to be actuated at predetermined times in the cycle of the machine for moving said fastening mechanism into position over the bottom of the shoe and for moving it out of said position.

135. In a machine of the class described, the combination with a shoe support, and means for operating on shoe materials on said support, of a gang fastening mechanism for driving fastenings substantially simultaneously in opposite sides of the shoe bottom, and mechanism automatically operative in the cycle of the machine to move said fastening mechanism from an idle position substantially at one side of the shoe to a position over the bottom of the shoe and subsequently to return it to its idle position.

136. In a machine of the class described, the combination with means for working the margin of an upper inwardly over the heel seat face of an insole, of a gang tacker comprising a plurality of tack driving devices for fastening the margin of the upper to the insole at opposite sides of the heel seat, said tack driving devices being movable as a unit in fixed relation to one another from an idle position to a position over the heel seat, and mechanism automatically operative in the cycle of the machine to move said tacker into position over the heel seat and subsequently to return it to its idle position.

137. In a machine of the class described, the combination with a shoe support, and means for operating on shoe materials on said support, of a gang fastening mechanism for driving fastenings substantially simultaneously at opposite sides of the bottom of the shoe, said fastening mechanism being movable as a unit into and out of position over the bottom of the shoe, and a device automatically operative to lock said fastening mechanism in its position over the bottom of the shoe.

138. In a machine of the class described, the combination with means for working the margin of an end portion of an upper inwardly over a form, of a gang fastening mechanism for fastening the opposite side portions of the margin of the upper substantially simultaneously, said fastening mechanism being mounted for movement as a unit into and out of position over the bottom of the form, automatically controlled power means for moving said fastening mechanism into position over the bottom of the form at a predetermined time in the cycle of the machine and for then maintaining it in said position, and additional power means for imparting to said fastening mechanism movement toward the plane of the bottom of the form prior to the fastening operation.

139. In a machine of the class described, the combination with means for working the margin of an end portion of an upper inwardly over a form, of a gang fastening mechanism for fastening the opposite side portions of the margin of the upper substantially simultaneously, a support having a guideway along which said fastening mechanism is movable into position over the bottom of the form, automatically controlled power means for moving the fastening mechanism into said position, and additional automatically controlled means for moving said supoprt to carry the fastening mechanism toward the plane of the bottom of the form prior to the fastening operation.

140. In a machine of the class described, the combination with a work support and means for operating on work on said support, of tack driving means mounted for positioning movement into and out of operative relation to the work, mechanism for operating said tack driving means when in operative relation to the work, comprising gearing mounted for positioning movement with said means, and an operative member arranged to maintain a continuous operative connection with said gearing in different positions of the tack driving means.

141. In a machine of the class described, the combination with a shoe support and means for operating on shoe materials on said support, of a gang tacker movable into and out of position over the bottom of the shoe, said tacker comprising tack driving means and its operating mechanism movable together as a unit and including a driven gear wheel, and a driving shaft along which said gear wheel is movable to maintain a continuous operative connection with said operating mechanism.

142. In a machine of the class described, the combination with a plurality of differently located mechanisms for operating on different pieces of work in different locations, of a single fastening mechanism mounted for movement selectively to said different locations for operating on the different pieces of work.

143. In a machine of the class described, the combination with a plurality of differently located mechanisms for operating on different pieces of work in different locations, of a single fastening means, and means automatically operative as an incident to the operation of any one of said differently located mechanisms to move the fastening means to the location of that mechanism.

144. In a machine of the class described, the combination with a plurality of differently located mechanisms for operating on different pieces of work in different locations, of a gang tacker mounted for movement selectively to said different locations, and means automatically operative as an incident to the operation of any one of said mechanisms to move the tacker to the location of that mechanism and then to operate it and return it to its starting position.

145. In a machine of the class described, the combination with mechanism for operating on a shoe in one location, and another mechanism for operating on a shoe in a different location, of a single fastening mechanism mounted for movement into or out of position over the bottom of either shoe for driving fastenings into the shoe materials.

146. In a machine of the class described, the combination with different mechanisms for performing similar operations on different shoes in different locations, of a single fastening means occupying normally an idle position remote from said different mechanisms, and means automatically operative as an incident to the operation of any one of said mechanisms to move said fastening means to the location of that mechanism and subsequently to return it to its idle position.

147. In a machine of the class described, the combination with different mechanisms for operating on shoes in different locations, of a single fastening mechanism movable selectively to said different locations, and means automatically operative to lock said fastening mechanism in any one of said locations.

148. In a machine of the class described, the combination with different mechanisms for operating on different pieces of work in different locations, of a single fastening mechanism mounted for movement in a predetermined path to a position over any one of the different pieces of work and then downwardly toward the work into position for driving fastenings into the work.

149. In a machine of the class described, the combination with means for operating on different shoes in different locations, of a single fastening mechanism, and automatic means for moving said fastening mechanism into position over the bottom of any one of said shoes and then toward the plane of the shoe bottom prior to the fastening operation.

150. In a machine of the class described, the combination with means for operating on different shoes in different locations, of a single fastening mechanism, a support along which said fastening mechanism is guided for movement to positions over the different shoes, and means for moving said support to carry the fastening mechanism toward any one of the shoes after it has been positioned over said shoe.

151. In a machine of the class described, the combination with means for operating on different shoes in different locations, of a gang tacker mounted for movement in a predetermined path into operative relation to any one of said shoes, and means for operating said tacker to drive its tacks when the tacker is located in operative relation to any shoe.

152. In a machine of the class described, the combination with different shoe forms and means for shaping shoe uppers over said forms, of a single fastening mechanism mounted for movement in a predetermined path to the location of any one of said forms for fastening the upper after it has been shaped over said form.

153. In a machine of the class described, the combination with a pair of upper shaping mechanisms positioned in different locations, of a single upper fastening mechanism mounted for movement from an idle position substantially between said different locations into position to fasten an upper shaped by either of said mechanisms.

154. In a machine of the class described, the combination with different mechanisms for shaping shoe uppers in different locations, of a single fastening mechanism, and means for operating said fastening mechanism as an incident to the operation of any one of said upper shaping mechanisms to fasten an upper shaped by said mechanism.

155. In a machine of the class described, the combination with a pair of upper shaping mechanisms for shaping shoe uppers in different locations, of a single fastening mechanism mounted for movement to either of said locations, and means automatically operative as an incident to the operation of either of said upper shaping mechanisms to move said fastening mechanism into operative relation to that shaping mechanism and subsequently to return it to its starting position.

156. In a machine of the class described, the combination with mechanism for shaping the heel end port'on of an upper over an insole in one location, and another mechanism for shaping the heel end portion of an upper over an insole in a different location, of a gang tacker mounted for movement in a predetermined path from a normally idle position into position to fasten the upper to the insole in either of said locations.

157. In a machine of the class described, the combination with mechanism for shaping the heel end portion of an upper over an insole in one location, and another mechanism for shaping the heel end portion of an upper over an insole in a different location, of a gang tacker movable into position to fasten the upper to the insole in either of said locations, and controlling means for said tacker automatically operative as an incident to the operation of either of said upper shaping mechanisms to move the tacker to the location of that mechanism and to operate it to drive its tacks.

158. In a machine of the class described, the combination with different mechanisms for shaping the heel end portions of uppers over their insoles in different locations, of a gang tacker movable selectively to said different locations, and mechanism operative in any one of said locations to cause the tacker to drive its tacks.

159. In a machine of the class described, the combination with different mechanisms for shaping the heel end portions of uppers over their insoles in different locations, of a gang tacker movable into position over the heel seat of an insole in any one of said locations, and means for moving said tacker toward the heel seat after it has been thus positioned.

160. In a machine of the class described, the combination with a pair of upper shaping mechanisms in different locations, of a single fastening mechanism movable from a position substantially between said different locations into operative relation to either upper shaping mechanism, and automatically operative means comprising a rack and a pinion for moving said fastening mechanism from its intermediate position in opposite directions to position it in relation to the different respective upper shaping mechanisms.

161. In a machine of the class described, the combination with different upper shaping mechanisms in different locations, of a single upper fastening mechanism, a support along which said fastening mechanism is movable to said different locations, a rack connected to said fastening mechanism, and a pinion for operating said rack to move the fastening mechanism along its support.

162. In a machine of the class described, the combination with twin mechanisms for operating on shoe materials in different locations, of a cross-head extending into operative relation to both said mechanisms, a gang tacker movable along said cross-head to the location of either of said mechanisms, and means for operating said cross-head to move the tacker toward the work in either location.

163. In a machine of the class described, the combination with twin mechanisms for operating on shoe materials in different locations, of a movable cross-head, a gang tacker movable along said cross-head to either of said locations, means automatically operative as an incident to the operation of either of said mechanisms to move the tacker to the location of that mechanism, and additional means for lowering said cross-head to move the tacker toward the work.

164. In a machine of the class described, the combination with different mechanisms for operating on shoe materials in different locations, of fastening mechanism mounted for movement in a predetermined path to any one of said locations, an operating member relatively to which said fastening mechanism is thus movable, and means for maintaining a continuous operative connection between said member and the fastening mechanism to effect the driving of the fastenings in the different locations of said mechanism.

165. In a machine of the class described, the combination with twin mechanisms for operating on shoe materials in different locations, of a gang tacker mounted for movement to either one of said locations, an operating shaft along which said tacker is thus movable, and operating connections between said shaft and the tacker comprising a gear movable with the tacker in sliding engagement with said shaft.

166. In a machine of the class described, the combination with different mechanisms for operating on work in different locations, of a single fastening mechanism comprising separating means and driving means for fastenings mounted for movement as a unit to any one of said different locations.

167. In a machine of the class described, the combination with means for operating on shoe materials in different locations, of a gang tacker comprising a plurality of tack drivers and a tack separator mounted for movement as a unit to any one of said locations.

168. In a machine of the class described, the combination with twin mechanisms for operating on shoe materials in different locations, of a single fastening mechanism movable to either of said locations, and power transmitting connections for effecting selectively the movement of said fastening mechanism to either of said locations.

169. In a machine of the class described, the combination with twin mechanisms for operating on shoe materials in different locations, of a single fastening mechanism movable to either of said locations, a power shaft, gearing connections comprising members for moving said fastening mechanism respectively to said different locations, and automatically controlled clutch means for connecting the power shaft to said different members selectively.

170. In a machine of the class described, the combination with twin mechanisms for operating on shoe materials in different locations, of a single fastening mechanism movable to either of said locations, clutch means through which said fastening mechanism is moved to either of said locations, and cam means automatically operative as an incident to the operation on shoe materials in either location to render said clutch means effective to move the fastening mechanism to that location.

171. In a machine of the class described, the combination with different mechanisms for operating on shoe materials in different locations, of a single fastening means movable to any one of said locations, and automatically controlled power means operative as an incident to the operation of any one of said different mechanisms to move said fastening means to the location of that mechanism, to stop it in that location for the fastening operation, and subsequently to return it to its starting position.

172. In a machine of the class described, the combination with different mechanisms for operating on shoe materials in different locations, of a gang tacker movable to any one of said locations, clutch controlled power means for moving said tacker to the different locations selectively, and power operated cams associated with said different respective mechanisms for initiating and stopping the movements of the tacker relatively to the different mechanisms.

173. In a machine of the class described, the combination with different upper shaping mechanisms for shaping shoe uppers in different locations, of a single upper fastening mechanism movable to any one of said different locations, a power shaft, power transmitting connections comprising a clutch for moving said fastening mechanism to the different locations by the operation of said shaft, and cams associated with the different upper shaping mechanisms for controlling said clutch.

174. In a machine of the class described, the combination with different upper shaping mechanisms for shaping uppers in different locations, of devices movable into and out of position to jig the uppers in relation to said upper shaping mechanisms, and a single upper fastening mechanism movable to the location of any one of said upper shaping mechanisms for fastening the different uppers.

175. In a machine of the class described, the combination with different mechanisms for shaping uppers over insoles in different locations, of devices movable into and out of position over the bottom faces of said insoles for jigging the different uppers in relation to the upper shaping mechanisms, and a single fastening mechanism movable into position over the bottom face of the insole in any of said locations for fastening the upper to the insole.

176. In a machine of the class described, the combination of end embracing wipers constructed to wipe the margin of an upper inwardly over the heel seat face of an insole and to shape said margin into the angle between the feather and the lip of the insole in front of the heel seat, means for imparting operative closing movement to said wipers, and fastening mechanism constructed to drive a plurality of fastenings to secure the margin of the upper to the insole while the wipers are maintained substantially at the limit of their closing movement in holding relation to the upper.

177. In a machine of the class described, the combination of end embracing wipers constructed to wipe the margin of an upper inwardly over the heel seat face of an insole and to shape said margin into the angle between the feather and the lip of the insole in front of the heel seat, said wipers being provided with a plurality of openings through which to drive fastenings for securing the margin of the upper to the insole, and upper fastening mechanism constructed to drive fastenings through said openings in the wipers while the wipers are holding the upper upon the heel seat and in said angle between the feather and the lip of the insole.

178. In a machine of the class described, the combination of end embracing wipers and means for operating them to gather and wipe the margin of an end portion of an upper inwardly over an insole, said wipers being provided with a plurality of openings through which to drive fastenings for securing the margin of the upper to the insole, and upper fastening mechanism movable independently of said wipers into position to drive fastenings through said openings.

179. In a machine of the class described, the combination of end embracing wipers for gathering and wiping the margin of an end portion of an upper inwardly over an insole, said wipers being provided with a plurality of openings through which to drive fastenings for securing the upper to the insole, upper fastening mechanism for driving fastenings through said openings in the wipers, and means automatically operative after the wipers have substantially completed their overwiping movement to move said fastening mechanism into position to drive the fastenings through said openings.

180. In a machine of the class described, the combination of end embracing wipers for gathering and wiping the margin of an end portion of an upper inwardly over an insole, said wipers being provided with a plurality of openings through which to drive upper securing fastenings, of upper fastening mechanism comprising a plurality of tack holders mounted for movement relatively to the wipers into substantial alinement with said openings and for additional movement toward the plane of the insole prior to the tack driving operation.

181. In a machine of the class described, the combination of end embracing wipers for gathering and wiping the margin of an end portion of an upper inwardly over an insole, said wipers being provided with a plurality of openings through which to drive upper securing fastenings, and a gang tacker mounted independently of the wipers for movement into position to drive a plurality of tacks through said openings in the wipers.

182. In a machine of the class described, the combination of end embracing wipers for gathering and wiping the margin of an end portion of an upper inwardly over an insole, said wipers being provided with a plurality of openings through which to drive upper securing fastenings, and tack driving means comprising a plurality of tack holders and drivers movable relatively to the wipers to position the tack holders substantially in said openings in the wipers prior to the tack driving operation.

183. In a machine of the class described, the combination of end embracing wipers for gathering and wiping the margin of an end portion of an upper inwardly over an insole, said wipers being provided with a plurality of openings through which to drive upper securing fastenings, and a gang tacker comprising a plurality of tack holders and drivers mounted for movement as a unit to a position over the insole and for additional movement toward the plane of the insole to position said tack holders substantially in said openings in the wipers prior to the tack driving operation.

184. In a machine of the class described, the combination with end embracing wipers for gathering and wiping the margin of an end portion of an upper inwardly over a form, of operating means for imparting a plurality of overwiping movements to said wipers, and mechanism automatically operative to effect a gradual relative movement of the wipers and the form in a direction to compress the margin of the upper during repeated movements of the wipers over the form.

185. In a machine of the class described, the combination with upper shaping means comprising end embracing wipers for wiping the margin of an upper inwardly over a form, of a shoe support mounted for movement to carry the work toward said upper shaping means and comprising an operating device for imparting to the form a movement transversely of the plane of the wipers for compressing the margin of the upper, and a cam into the path of which said operating device is carried by the movement of the shoe support for imparting the compressing movement to said device.

186. In a machine of the class described, the combination with upper shaping means comprising end embracing wipers for wiping the margin of an upper inwardly over a form, of a shoe support mounted for movement to carry the work toward the upper shaping means and comprising toggle mechanism for imparting to the form a movement transversely of the plane of the wipers for compressing the margin of the upper, and a cam into operative relation to which said toggle mechanism is carried by the movement of the shoe support for operating said mechanism to impart the compressing movement to the form.

187. In a machine of the class described, the combination with a band for embracing the heel end portion of an upper and shaping it about a form, of toggles positioned at the opposite sides of said band to apply inwardly directed pressure to the band, and mechanism operative through said toggles to close the band inwardly about the form.

188. In a machine of the class described, the combination with a band for embracing the heel end portion of an upper and shaping it about a form, of means for closing the band about the form comprising toggles arranged to apply inwardly directed pressure to the opposite side portions of the band where it curves about the rear end of the form, and means for operating said toggles.

189. In a machine of the class described, the combination with a band for embracing the heel end portion of an upper and shaping it about a form, of toggles positioned at opposite side portions of the band for closing the band inwardly about the form, additional toggles positioned to apply inwardly directed pressure to the opposite side portions of the band where it curves about the end of the form, and mechanism for operating the several toggles to press the band inwardly about the form.

190. In a machine of the class described, the combination with a band for embracing the heel end portion of an upper and shaping it about a form, of toggles positioned at opposite side portions of the band for closing the band inwardly about the form, additional toggles positioned to apply inwardly directed pressure to the opposite side portions of the band where it curves about the end of the form, a forwardly movable operating member, and link connections between said member and the toggles for operating the toggles to press the band inwardly about the form.

191. In a machine of the class described, the combination with a band for embracing the heel end portion of an upper and shaping it about a form, of toggles positioned at opposite sides of the band for applying inwardly directed pressure to the band, means for operating said toggles to close the band about the form, and springs arranged to back up said toggles and permit them to yield as the pressure is applied.

192. In a machine of the class described, the combination with a band for embracing the heel end portion of an upper and shaping it about a form, of toggles positioned at opposite side portions of the band for closing the band inwardly about the form, additional toggles positioned to apply inwardly directed pressure to the opposite side portions of the band where it curves about the end of the form, means for operating the several toggles to press the band inwardly about the form, and springs associated with said toggles to permit the toggles to yield as the pressure is applied.

193. In a machine of the class described, the combination with different mechanisms for operating on work in different locations, and separately controlled power means for operating said different mechanisms selectively, of controlling means automatically operative upon the starting of one of said mechanisms to prevent the starting of the other mechanism.

194. In a machine of the class described, the combination with different mechanisms for operating on work in different locations, power means for operating said different mechanisms selectively, and a starting device for each mechanism, of controlling means automatically operative upon the starting of one of said mechanisms to render the starting device for the other mechanism ineffective to start that mechanism.

195. In a machine of the class described, the combination with different upper shaping mechanisms for shaping uppers in different locations, of treadles for starting the different respective mechanisms in operation, and means automatically operative upon the starting of either of said upper shaping mechanisms to render the treadle associated with the other upper shaping mechanism ineffective to start that mechanism.

196. In a machine of the class described, the combination with different upper shaping mechanisms for shaping uppers in different locations, of treadles for starting the different respective mechanisms in operation, and treadle locking mechanism automatically operative upon the depression of either treadle to lock the other treadle against depression.

197. In a machine of the class described, the combination with different mechanisms for operating on work in different locations, and a single device common to said different mechanisms and automatically operative as an incident to the operation of either of said mechanisms to perform an additional operation on the work, of controlling means automatically operative upon the starting of one of said mechanisms to prevent the starting of the other mechanism.

198. In a machine of the class described, the combination with different mechanisms for operating upon shoe materials in different locations, of a single fastening means movable selectively to said different locations to operate upon the work, means for moving said fastening means to either location as an incident to the operation of the mechanism in that location, and controlling means automatically operative upon the starting of either of said mechanisms to prevent the starting of the other mechanism.

199. In a machine of the class described, the combination with different upper shaping mechanisms for shaping shoe uppers in different locations, of a single upper fastening mechanism movable selectively to said different locations, means automatically operative as an incident to the operation of either of said upper shaping mechanisms to move the fastening mechanism to that location and to operate it, treadles associated with the different respective upper shaping mechanisms for starting them in operation, and means automatically operative upon the starting of either of said upper shaping mechanisms to render the treadle for the other mechanism ineffective to start that mechanism.

200. In a machine of the class described, the combination with means for shaping an end portion of an upper over a form, of members arranged to engage the corresponding end of an insole in jig holes provided in predetermined relation to the edge contour of the insole to determine the position of the insole in relation to the form prior to the fastening of the upper to either end of the insole.

201. In a machine of the class described, the combination with a heel end form and means for molding the heel end portion of an upper over said form, of a plurality of jig pins located in predetermined relation to said form for engaging an insole in jig holes provided in its heel end portion in predetermined relation to its edge contour to determine the position of the insole in relation to the form and the upper molding means preparatory to the fastening of the molded upper to the insole.

202. In a machine of the class described, the combination of work positioning means comprising members arranged in predetermined relation to each other for engaging positioning surfaces formed on different shoe parts in predetermined relation to characteristics of said parts to determine the relation of said parts to each other, and means for shaping one of said parts in the relation thus determined preparatory to fastening it to the other part.

203. In a machine of the class described, the combination of work positioning means comprising jig pins arranged in predetermined relation to each other for engaging different shoe parts in jig holes formed in said parts in predetermined relation to characteristics thereof to determine the relation of said parts to each other, and means for shaping one of said parts in the relation thus determined preparatory to fastening it to the other part.

204. In a machine of the class described, the combination with upper shaping means, of means for positioning an upper and an insole in predetermined relation to each other and to said upper shaping means comprising members arranged in predetermined relation to each other for engaging positioning surfaces formed on said upper and insole in predetermined relation to characteristics of the upper and the insole respectively.

205. In a machine of the class described, the combination with means for shaping an end portion of an upper over a form, of means for positioning an upper and an insole in predetermined relation to each other and to the upper shaping means and the form comprising jig pins arranged in predetermined relation to each other for engaging corresponding end portions of the upper and the insole in jig holes provided therein in predetermined relation to characteristics of said upper and insole respectively.

In testimony whereof I have signed my name to this specification.

WILLIAM C. BAXTER.